US011643344B2

(12) United States Patent
MacKenzie et al.

(10) Patent No.: US 11,643,344 B2
(45) Date of Patent: *May 9, 2023

(54) METHODS OF GAS INFUSION FOR WASTEWATER TREATMENT

(71) Applicant: Prosper Technologies, LLC, Miami, FL (US)

(72) Inventors: Mark Max MacKenzie, Miami, FL (US); David Wade Campbell, Miami, FL (US)

(73) Assignee: Prosper Technologies, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,897

(22) Filed: Jul. 8, 2022

(65) Prior Publication Data

US 2022/0356097 A1    Nov. 10, 2022

Related U.S. Application Data

(63) Continuation of application No. PCT/US2022/027434, filed on May 3, 2022.
(Continued)

(51) Int. Cl.
*C02F 3/10* (2023.01)
*B01F 23/237* (2022.01)
(Continued)

(52) U.S. Cl.
CPC ...... *C02F 3/109* (2013.01); *B01F 23/231244* (2022.01); *B01F 23/231265* (2022.01);
(Continued)

(58) Field of Classification Search
CPC .. C02F 3/208; C02F 3/201; C02F 3/26; B01F 23/23124; B01F 23/231244; B01F 2101/305; B01F 2215/0431; B01F 23/23; B01F 23/231265; B01F 23/2319; B01F 23/237612
(Continued)

(56) References Cited

U.S. PATENT DOCUMENTS 4,181,604 A    1/1980 Onishi et al.
5,034,164 A    7/1991 Semmens
(Continued)

FOREIGN PATENT DOCUMENTS

CN    106698695 A    5/2017
EP    865729 A1 *  9/1998    ............ A01K 63/04
JP    2021-000607 A    1/2021

OTHER PUBLICATIONS

International Written Opinion and Search Report for Application No. PCT/US2022/027434, dated Aug. 16, 2022, 68 pages.
(Continued)

*Primary Examiner* — Claire A Norris
(74) *Attorney, Agent, or Firm* — Knobbe, Martens, Olson & Bear, LLP

(57) ABSTRACT

This application relates to a method of treating wastewater wherein an oxygen infusion system is used to supersaturate wastewater before aerobic biological processes, wherein oxygen is transferred to the wastewater free of oxygen bubbles and achieves a reduction in power demand for the aeration process of wastewater.

18 Claims, 24 Drawing Sheets

Related U.S. Application Data

(60) Provisional application No. 63/214,000, filed on Jun. 23, 2021, provisional application No. 63/184,906, filed on May 6, 2021.

(51) Int. Cl.
  *B01F 23/231* (2022.01)
  *C02F 3/12* (2023.01)
  *C02F 3/20* (2023.01)
  *B01F 35/221* (2022.01)
  *B01F 101/00* (2022.01)
  *B01D 63/02* (2006.01)

(52) U.S. Cl.
  CPC ........... *B01F 23/231269* (2022.01); *B01F 23/237612* (2022.01); *B01F 35/2211* (2022.01); *C02F 3/1289* (2013.01); *C02F 3/201* (2013.01); *C02F 3/208* (2013.01); *B01D 63/02* (2013.01); *B01F 2101/305* (2022.01); *B01F 2215/0431* (2013.01); *C02F 2203/006* (2013.01); *C02F 2203/008* (2013.01); *C02F 2209/21* (2013.01); *C02F 2209/38* (2013.01); *C02F 2209/40* (2013.01); *C02F 2301/08* (2013.01)

(58) Field of Classification Search
  USPC ...... 261/101, 102, DIG. 70; 210/321.8, 150, 210/500.23
  See application file for complete search history.

(56) References Cited

U.S. PATENT DOCUMENTS

| | | |
|---|---|---|
| 5,338,412 A | 8/1994 | Burk |
| 5,785,864 A | 7/1998 | Teran |
| 6,209,855 B1 * | 4/2001 | Glassford ......... B01F 23/23124 |
| | | 210/150 |
| 6,890,482 B2 | 5/2005 | Divino, Jr. et al. |
| 7,537,200 B2 | 5/2009 | Glassford |
| 7,713,413 B2 | 5/2010 | Barnes |
| 2002/0170863 A1 | 11/2002 | Singh et al. |
| 2012/0024784 A1 | 2/2012 | Clark et al. |
| 2014/0052422 A1 | 2/2014 | Wan et al. |
| 2015/0014246 A1 | 1/2015 | McFadden |
| 2018/0016170 A1 | 1/2018 | Ogawa |
| 2018/0346854 A1 | 12/2018 | Mackenzie et al. |
| 2020/0208277 A1 | 7/2020 | Kim |
| 2020/0231478 A1 | 7/2020 | Rhu et al. |
| 2021/0276903 A1 | 9/2021 | Shechter et al. |

OTHER PUBLICATIONS

Office Action dated Sep. 14, 2022 in related U.S. Appl. No. 17/860,870, 9 pages.

Office Action dated Sep. 26, 2022 in related U.S. Appl. No. 17/860,824, 27 pages.

Office Action dated Oct. 6, 2022 in related U.S. Appl. No. 17/860,907, 22 pages.

* cited by examiner

"Biological Efficiency Factor" 0.3
"Low Pressure Water Pumps"

METHODS OF GAS INFUSION FOR WASTEWATER TREATMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and should be considered a part of this specification.

BACKGROUND

Field

This application is related to systems and methods for treating wastewater (e.g., industrial and/or municipal wastewater) and more specifically to system and methods of reducing the biochemical oxygen demand (BOD) and chemical oxygen demand (COD) levels in wastewater while optimizing energy consumption in aeration systems used in wastewater treatment systems.

Description of the Related Art

In order to protect the environment and promote public health, communities typically require treatment of municipal, industrial and agricultural wastewater. The discharge of untreated wastewater is not suitable, since it gives rise to numerous environmental concerns, such as the pollution of surface and groundwater resources. Untreated wastewater contains organic matter and nutrients that, if left untreated and not removed from the waste stream, can result in environmental pollution. Thus, when untreated wastewater is released into either above ground bodies of water or subsurface drain fields, the level of dissolved oxygen in the receiving waters begins to deplete, which endangers the water bodies themselves, along with the resident plant and aquatic life. Additionally, in developing nations, where potable water is scarce, it is often desirable to recover as much reclaimable water as possible from wastewater, rather than disposing of both the wastewater and the contaminants.

To treat wastewater, communities in highly populated areas commonly collect wastewater and transport it through a series of underground pipes to a large, centralized wastewater treatment plant. However, there are several problems associated with large, centralized treatment plants. Centralized wastewater treatment plants are designed and rated for processing a specific flow rate of wastewater per day, typically expressed as the rated capacity of the plant, and all treatment plants have a maximum flow rate capacity. Thus, if a centralized treatment plant receives more wastewater on a particular day than what the plant was designed to handle, problems are encountered. For example, when a treatment plant receives larger-than-normal amounts of untreated raw wastewater, treatment performance decreases and partially treated or untreated wastewater is discharged into a receiving body of water, such as a river, in order not to exceed the amount of wastewater the plant was designed to handle. Wastewater treatment systems that can accommodate surges in capacity are needed.

Wastewater treatment and in particular municipal sewage treatment usually requires aerobic steps and processes. In these stages the microorganisms present in the effluent (organic matter) when in contact with the presence of oxygen, promote reaction in which there is the conversion of the organic matter into carbon dioxide ($CO2$), water and inert compounds, eliminating the undesirable load. For this to occur, large volumes of oxygen are typically required, which need to be placed in contact with the effluent, in order to guarantee an adequate and stable aerobic environment to achieve the process.

In addition to agitation of the wastewater to create available oxygen for the biological processes many modern wastewater treatment facilities incorporate blown air systems and diffusers to bubble air at pressure through the wastewater in the aeration tanks or pools. All the conventional bubble systems, whether large bubble, small bubble, or micro bubble systems lose up to 90% of the available oxygen to the atmosphere. Conventional aeration systems (e.g., blowers and diffusers) used in wastewater treatment facilities input air that contains for normal conditions of pressure and temperature only 23% of oxygen, and much is lost to the atmosphere as the air bubbles through the wastewater and exits through the surface of the effluent in the aeration tanks. Additionally, such blower systems typically require large amounts of energy, often representing as much as half or more of the total energy consumption of the facility. The same blower systems may require blower houses to accommodate the noise pollution from the fans, as well as expensive stainless steel distribution systems. The result is that though blower systems provide for improved biological processes in the aeration tanks of a wastewater treatment facility, they are also inefficient and expensive.

SUMMARY

Therefore, there is a need for an improved system and method to provide oxygen to the aerobic portions of a wastewater treatment process (e.g., industrial and/or municipal wastewater treatment). In accordance with one aspect of the disclosure, an improved gas infusion system and a more efficient method for providing oxygen to the biological processes in wastewater treatment advantageously increases the amount of oxygen provided to the biological processes while simultaneously reducing the total energy consumption of the wastewater treatment process. Additionally, the improved gas infusion system advantageously reduces the system installation, operating, and maintenance costs, while at the same time providing the capability to facility surges and fluctuations in capacity.

In accordance with one aspect of the disclosure, a wastewater treatment system (e.g., industrial and/or municipal wastewater treatment) is provided comprising an oxygen infusion system for transferring oxygen to wastewater such that oxygenated wastewater is free of oxygen bubbles.

In accordance with another aspect of the disclosure, a wastewater treatment system comprises: a wastewater supply; an oxygen generator configured to supply pressurized oxygen at least 90% pure; an oxygen infusion system comprising; one or more oxygen infusion modules comprising a plurality of hydrophobic microporous hollow core membranes or fibers; wherein each oxygen infusion module is in fluid communication with the oxygen generator, the oxygenator configured to provide a supply of pressurized oxygen to each membrane in the plurality of hydrophobic microporous hollow core membranes or fibers; wherein the oxygen infusion module is configured to receive the wastewater supply such that the wastewater surrounds each membrane in the plurality of hydrophobic microporous hollow core membranes or fibers; wherein each membrane or fiber of the plurality of hydrophobic microporous hollow core membranes or fibers is configured to allow transfer of the pressurized oxygen to the wastewater through a plurality of micropores such that oxygen transfer to the wastewater occurs free of oxygen bubbles in the wastewater; and an oxygenated wastewater discharge.

In accordance with another aspect of the disclosure, a method of oxygenating wastewater for use in aerobic wastewater treatment, comprises: providing a supply of wastewater; generating a supply of pressurized oxygen using an oxygen generator, wherein the oxygen concentration is at least 70%; providing an oxygen infusion system comprising a plurality of hydrophobic microporous hollow core membranes or fibers in fluid communication with the oxygen generator, wherein each membrane further comprises a plurality of micropores having a pore pathway diameter of between about 0.01 µm to about 5 µm; providing direct contact between the pressurized oxygen and the wastewater by transferring oxygen through the plurality of micropores of the membrane so that the pressurized oxygen enters the wastewater free of oxygen bubbles; transferring oxygen to the wastewater to form a supersaturated effluent having a level of oxygen concentration above 60 ppm (e.g., above 62 ppm) while the dissolved oxygen remained 2-3 ppm in the aeration tank (e.g., biological reactor); discharging the supersaturated effluent to an aeration reservoir. Additionally, recirculating or using a stream of the mixed liquor of the aeration tank itself to be supersaturated advantageously increased control and process benefits than supersaturating the raw sewage stream.

Advantages of the present invention include: (1) reduced power consumption for increased available oxygen; (2) reduction of wasted air blower power; (3) more efficient oxygenation and use of available oxygen; (4) reduction of biochemical oxygen demand (BOD); (5) reduced footprint for blower requirements reducing plant size and capital expenditures; (6) flexibility to increase oxygen to meet increased demand; (7) modular construction that facilitates expansion of plant capacity; (8) reduction in sludge produced by the activated sludge process; (9) reduction in chemicals used in the activated sludge process.

In accordance with one aspect of the disclosure, a wastewater oxygenation system is provided. The system comprises an oxygen source configured to supply pressurized oxygen of at least 70% purity, and n oxygen infusion system comprising one or more oxygen infusion modules. Each oxygen infusion module comprises a housing, a plurality of hydrophobic hollow microporous fibers disposed in the housing, each of the hydrophobic hollow microporous fibers having a longitudinal bore and a plurality of micropores on a circumferential wall about the longitudinal bore. Each oxygen infusion module is in fluid communication with the oxygen source so that the plurality of hydrophobic hollow microporous fibers receive the pressurized oxygen from the oxygen source through the longitudinal bore thereof. The oxygen infusion system is configured to receive a flow of wastewater from a wastewater supply line such that the wastewater flows through each of the one or more oxygen infusion modules and comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater. The oxygenated wastewater is discharged from the oxygen infusion system via a wastewater output connection.

In accordance with another aspect of the disclosure, a wastewater oxygenation system is provided. The system comprises a tank having a cover with an inlet opening configured to receive a flow of wastewater therethrough, and a tank vessel disposed below the cover, the tank vessel having an outlet opening at a distal end of the tank vessel. The system also comprises a plurality of oxygen infusion modules arranged in parallel and disposed in the tank vessel below the cover. Each oxygen infusion module comprises a housing and a plurality of hydrophobic hollow microporous fibers disposed in the housing, each of the hydrophobic hollow microporous fibers having a longitudinal bore and a plurality of micropores on a circumferential wall about the longitudinal bore. Each of the oxygen infusion modules is configured to receive a portion of the flow of wastewater such that the wastewater comes in contact with the circumferential wall of one or more of the plurality of hydrophobic hollow microporous fibers, and each of the oxygen infusion modules is configured to receive a flow of pressurized oxygen so that the pressurized oxygen is transferred to the wastewater through the plurality of micropores such that oxygen transfer to the wastewater occurs free of oxygen bubbles in the wastewater. The wastewater flows through the plurality of oxygen infusion modules in parallel and the pressurized oxygen flows through the plurality of oxygen infusion modules in parallel. The oxygenated wastewater is discharged from the tank via the outlet opening in the tank vessel.

In accordance with another aspect of the disclosure, a wastewater oxygenation system is provided. The system comprises a tank having a cover with an inlet opening configured to receive a flow of wastewater therethrough, and a tank vessel disposed below the cover, the tank vessel having an outlet opening at a distal end of the tank vessel. The system also comprises a first array of oxygen infusion modules arranged in parallel and disposed in the tank vessel below the cover, and a second array of oxygen infusion modules arranged in parallel and disposed in the tank vessel, the second array spaced below the first array so that the second array is in series with the first array. Each oxygen infusion module in the first array and the second array comprises a housing and a plurality of hydrophobic hollow microporous fibers disposed in the housing, each of the hydrophobic hollow microporous fibers having a longitudinal bore and a plurality of micropores on a circumferential wall about the longitudinal bore. Each of the oxygen infusion modules is configured to receive a portion of the flow of wastewater such that the wastewater comes in contact with the circumferential wall of one or more of the plurality of hydrophobic hollow microporous fibers, and each of the oxygen infusion modules is configured to receive a flow of pressurized oxygen so that the pressurized oxygen is transferred to the wastewater through the plurality of micropores such that oxygen transfer to the wastewater occurs free of oxygen bubbles in the wastewater. The wastewater flows in parallel through the oxygen infusion modules of each of the first array and the second array, the pressurized oxygen flows in parallel through the oxygen infusion modules of the each of the first array and the second array, and the wastewater flows through the second array after it flows through the first array. The oxygenated wastewater is discharged from the tank via the outlet opening in the tank vessel.

In accordance with another aspect of the disclosure, an oxygen infusion module is provided. The module comprises a housing, a central tube that extends along an axis of the housing, a top plug attached to a proximal end of the housing, and a bottom plug attached to a distal end of the housing. The module also comprises a plurality of hydrophobic hollow microporous fibers disposed in the housing and suspended from a disc and arranged about the central tube. The hydrophobic hollow microporous fibers have a length shorter than a length of the housing, each of the hydrophobic hollow microporous fibers having a longitudinal bore and a plurality of micropores on a circumferential wall about the longitudinal bore. The module also comprises a vent in fluid communication with the central tube and with a space inside the housing about the central tube, the vent being configured to vent undissolved oxygen and nitrogen from the oxygen infusion module. The oxygen infusion module is configured to receive a flow of pressurized oxygen from an oxygen source so that the plurality of hydrophobic hollow microporous fibers receive the pressurized oxygen from the oxygen source through the longitudinal bore thereof. The oxygen infusion module is configured to receive a flow of wastewater such that the wastewater flows through the central tube and into the housing so that it comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater. The oxygenated wastewater is discharged from the housing via one or more distal openings and via the bottom plug.

In accordance with another aspect of the disclosure an oxygen infusion module is provided. The module comprises a housing with one or more openings on a sidewall of the housing via which wastewater enters the housing. The module also comprises a plurality of hydrophobic hollow microporous fibers disposed in the housing and suspended from a disc, each of the hydrophobic hollow microporous fibers having a longitudinal bore and a plurality of micropores on a circumferential wall about the longitudinal bore. The oxygen infusion module is configured to receive a flow of pressurized oxygen from an oxygen source so that the plurality of hydrophobic hollow microporous fibers receive the pressurized oxygen from the oxygen source through the longitudinal bore thereof. The oxygen infusion module is configured to receive a flow of wastewater via the one or more openings in the sidewall of the housing such that the wastewater comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater. The oxygenated wastewater is discharged from the housing via a distal end of the housing.

In accordance with another aspect of the disclosure, a method of oxygenating wastewater for use aerobic wastewater treatment is provided. The method comprises the step of generating a supply of pressurized oxygen using an oxygen generator, wherein the oxygen concentration is at least 70%. The method also comprises the step of supplying the pressurized oxygen to a first oxygen infusion system comprising one or more oxygen infusion modules. Each oxygen infusion module comprises a housing, and a plurality of hydrophobic hollow microporous fibers disposed in the housing. Each of the hydrophobic hollow microporous fibers has a longitudinal bore and a plurality of micropores on a circumferential wall about the longitudinal bore. Each oxygen infusion module is in fluid communication with the oxygen generator so that the pressurized oxygen is supplied to the plurality of hydrophobic hollow microporous fibers through the longitudinal bore thereof. The method also comprises the step of supplying a flow of wastewater to the one or more oxygen infusion modules such that the wastewater flows through each of the one or more oxygen infusion modules and comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater to form a supersaturated effluent having a level of oxygen concentration above 62 ppm. The method also comprises the step of discharging the supersaturated effluent to an aeration reservoir.

BRIEF DESCRIPTION OF THE DRAWINGS

Various embodiments are disclosed in the following detailed description and accompanying drawings.

DETAILED DESCRIPTION

This application relates to systems and methods for wastewater treatment (e.g., industrial and/or municipal wastewater treatment) and more specifically to improved systems and methods for facilitating biological processes in wastewater treatment. Advantageously, the systems and methods described herein facilitate infuse wastewater with oxygen rather than air, and the infusion of wastewater with oxygen in a manner free of bubbles (e.g., in a bubbleless manner) to supersaturate the wastewater with oxygen.

The process of treating and reclaiming water from wastewater (e.g., any water that has been used in homes, such as flushing toilets, washing dishes, or bathing, or water from industrial use, or water from agricultural facilities, or even water from storm sewers) starts with the expectation that after it is treated it will be clean enough to reenter the environment.

The quality of the water is dictated by various laws and regulations, for example, the Environmental Protection Agency (EPA) and the Clean Water Act, and wastewater facilities in the U.S. operate to specified permits by the National Pollutant Discharge Elimination System (NPDES). According to the EPA, the Clean Water Act (CWA) establishes the basic structure for regulating discharges of pollutants into the waters of the United States and regulating quality standards for surface waters. Under the CWA, EPA sets wastewater standards for industry. The EPA has also developed national water quality criteria recommendations for pollutants in surface waters. The EPA's National Pollutant Discharge Elimination System (NPDES) permit program controls discharges.

As an example of the expected standards, the Biochemical Oxygen Demand (BOD) of average wastewater effluent is 300 mg/L and the effluent after treatment is expected to be >30 mg/L. If a wastewater facility does not meet these expectations, it can risk stiff penalties.

Figure 1:
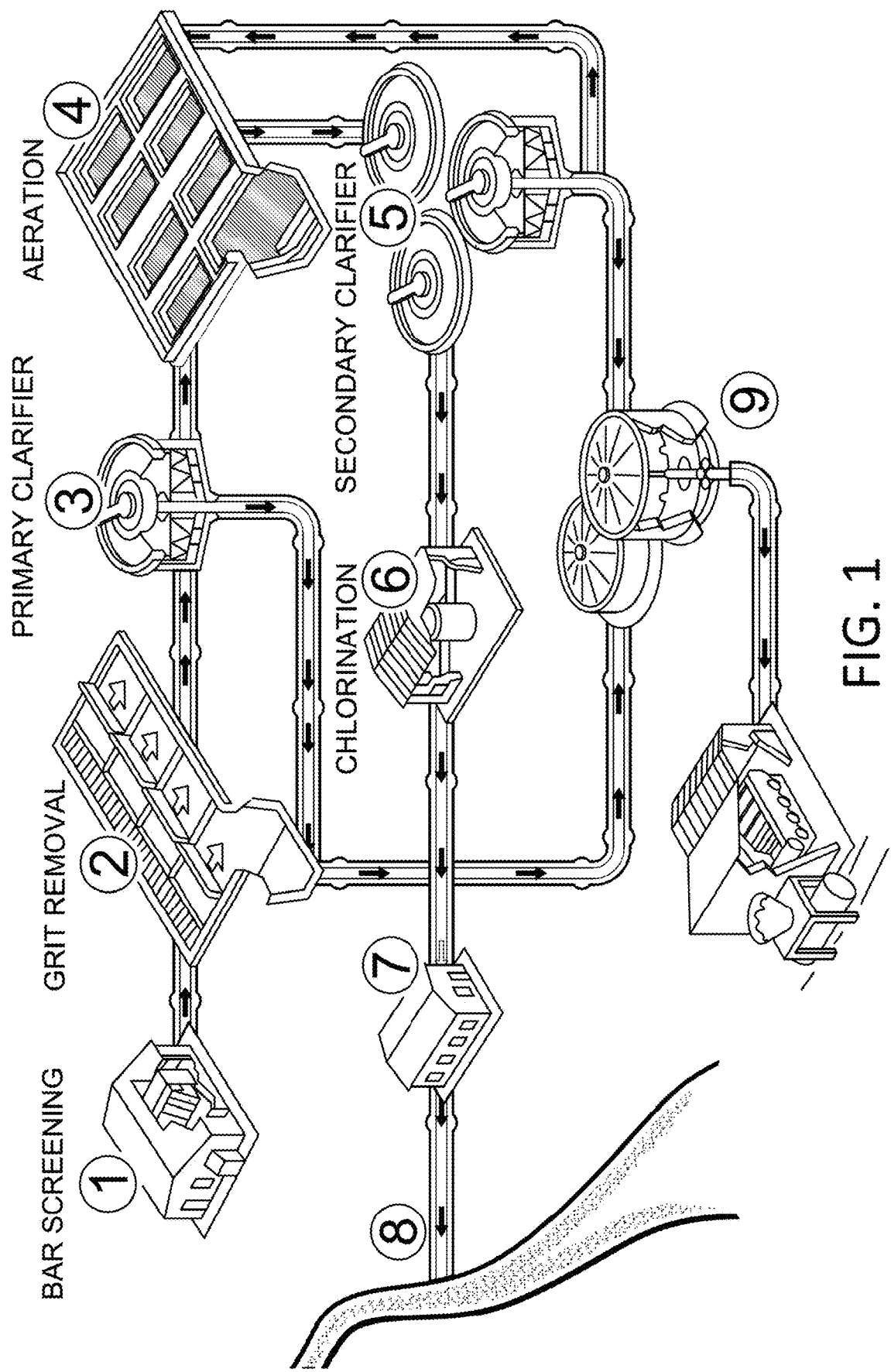
FIG. 1 is a flow diagram of an example of a prior-art wastewater treatment system.

With reference to FIG. 1, a common wastewater treatment process includes eight primary steps, including: (1) bar screening; (2) grit removal; (3) primary clarification; (4) aeration; (5) secondary clarification; (6) chlorination/chemical disinfection; (7) testing and certification; and (8) effluent discharge.

Bar Screening: The physical process of wastewater treatment begins with screening out large items that have found their way into the sewer system, and if not removed, can damage pumps and impede water flow. A bar screen is usually used to remove large items from the influent and ultimately taken to a landfill. Bar Screening involves the removal of large items from the influent to prevent damage to the wastewater treatment facility's pumps, valves and other equipment.

Grit Removal: Fine grit that finds its way into the influent needs to be removed to prevent the damage of pumps and equipment downstream (or impact water flow). Too small to be screened out in the bar screening step, this grit needs to be removed from the grit chamber. There are several types of grit chambers (horizontal, aerated or vortex) which control the flow of water, allowing the heavier grit to fall to the bottom of the chamber; the water and organic material continue to flow to the next stage in the wastewater treatment process. The grit is physically removed from the bottom of the chamber and discarded.

Primary Clarification: After the grit removal step, initial separation of solid organic matter is often applied. Solids known as organics/sludge sink to the bottom of the primary clarification tank and are pumped to a sludge digestor or sludge processing area (9), dried and hauled away. Proper settling rates are a key indicator for how well the clarifier is operating. Adjusting an influent flow rate into the clarifier can help the operator adjust the settling rates and efficiency.

After grit removal, the influent enters large primary clarifiers that separate out between 25% and 50% of the solids in the influent. These large clarifiers (for example tanks) allow for the heavy solids to sink to the bottom and the cleaner influent to flow. The effectiveness of the primary clarification is a matter of appropriate water flow. If the water flow is too fast, the solids don't have time to sink to the bottom resulting in negative impact on water quality downstream. If the water flow is too slow, it impacts the process up stream.

The solids that fall to the bottom of the primary clarifier are known as sludge and pumped out regularly to ensure it does not impact the process of separation. The sludge is then discarded after any water is removed and commonly used as fertilizer.

Aeration: After primary clarification, the influent is pumped to one or more aeration tanks. Air is pumped into the aeration tank/basin to encourage conversion of $NH_3$ (ammonia) to $NO_3$ (nitrate) and provide oxygen for bacteria to continue to propagate and grow. Once converted to $NO_3$, the bacteria remove/strip oxygen molecules from the nitrate molecules and the nitrogen (N) is given off as $N_2\uparrow$ (nitrogen gas). Conversion of $NO_3$ into $N_2$ (nitrogen gas) occurs in a part of a biological reactor (e.g., an anoxic tank or anoxic zone) where there is no remaining dissolved oxygen inside it.

At the heart of the wastewater treatment process is the encouragement and acceleration of the natural process of bacteria, breaking down organic material. This begins in the aeration tank. The primary function of the aeration tank is to pump oxygen into the tank to encourage the breakdown of any organic material (and the growth of the bacteria), as well as ensure there is enough time for the organic material to be broken down. Aeration can be accomplished with pumping and defusing air into the tank or through aggressive agitation that adds air to the water. This process is managed to offer the best conditions for bacterial growth. Aerobic bacteria will die if the dissolved oxygen levels in the wastewater falls below 2 ppm, reducing the efficiency of the plant. Levels of dissolved oxygen below 1 ppm results in the prevalence of anaerobic microorganisms instead of aerobic microorganisms. The anaerobic microorganisms have a lower efficiency of organic matter breakdown, reducing the effluent quality as well. Dissolved oxygen monitoring at this stage of the plant is critical. Ammonia and nitrate measurements are common to measure how efficient the bacteria are in converting $NH_3$ to $N_2\uparrow$.

A key parameter to measure in wastewater treatment is Biochemical Oxygen Demand (BOD). BOD is a surrogate indicator for organic material present and is used to determine the effectiveness of organic material breakdown. BOD is defined as the amount of oxygen demanded by the micro-organisms in the sewage for the decomposition of bio-degradable matter under aerobic condition. This is the most commonly used parameter to determine the strength of municipal or organic quality of the water. The standard BOD test determines the amount of oxygen required by the micro-organisms for the decomposition of the bio-degradable matter present in the wastewater sample under 5 days of aerobic condition at a temperature of 20 degree Celsius. It is measured in mg/l.

Chemical Oxygen Demand (COD) is the oxygen demand that is consumed by both inorganic and organic matter present in the wastewater sample. The chemical oxygen demand is expressed as the mass of oxygen consumed over the volume of the solution. Its SI unit is milligrams per liter (mg/l). BOD measures the amount of oxygen required by the aerobic organisms to decompose organic matter and COD measures the oxygen required to decompose organic and inorganic constituents present in the wastewater by chemical reaction. Hence, the value of COD is greater than BOD.

There are a number of other tests used to ensure optimal organic material breakdown (and BOD reduction) such as measuring pH, temperature, Dissolved Oxygen (DO), Total Suspended Solids (TSS), Hydraulic Retention Time (flow rate), Solids Retention Time (amount of time the bacteria is in the aeration chamber) and Mixed Liquor Suspended Solids. Ongoing and accurate monitoring is crucial to ensure the final required effluent BOD.

Secondary Clarification: Treated wastewater is pumped from the aeration tank into a secondary clarifier to allow any remaining organic sediment to settle out of treated water flow. As the influent exits the aeration process, it flows into a secondary clarifier where, like the primary clarifier, any very small solids (or fines) sink to the bottom of the tank. These small solids are called activated sludge and consist mostly of active bacteria. Part of this activated sludge is returned to the aeration tank to increase the bacterial concentration, help in propagation, and accelerate the breakdown of organic material. The excess is discarded. The water that flows from the secondary clarifier has substantially reduced organic material and should be approaching expected effluent specifications.

Chlorination and Chemical Disinfection: Typically, Chlorine is added to kill any remaining bacteria (or harmful microorganisms) in wastewater effluent following the secondary clarification. With the enhanced concentration of bacteria as part of the aeration stage, there is a need to test the outgoing effluent for bacteria presence or absence and to disinfect the water. This ensures that higher than specified concentrations of bacteria are not released into the environment. Chlorination is the most common and inexpensive type of disinfection but ozone and UV disinfection are also increasing in popularity. If chorine is used, it is important to test for free-chlorine levels to ensure they are acceptable levels before being released into the environment.

Testing and Certification: Before effluent is released to the environment, most jurisdictions require testing and or certification that the treated wastewater meats minimum regulatory standards. Testing for proper pH level, ammonia, nitrates, phosphates, dissolved oxygen, and residual chlorine levels to conform to the plant's operating permits are critical to the plant's performance. Although testing is continuous throughout the wastewater treatment process to ensure optimal water flow, clarification and aeration, final testing is done to make sure the effluent leaving the plant meets permit specifications.

Effluent Discharge: After meeting all permit specifications, clean water is reintroduced into the environment.

Conventional aeration systems used in wastewater treatment facilities may include expensive and inefficient air blowers, diffusers, and multiple delivery pipes to create bubbles throughout the effluent in the aeration tank. The air is bubbled through the effluent, but only contains ambient concentrations of oxygen (approximately 21%). Bubbling air through the effluent loses much of the available oxygen to the atmosphere (e.g., due to the bubbles rising through the effluent and breaking through the surface of the aeration tank) before oxygen can transfer to the water due to the small surface area of the large bubbles. In some examples, as much as 90% of the available oxygen in a fine bubbler system may escape to the atmosphere.

Another issue with traditional aeration systems relates to the high electrical demand and cost to operate aeration blowers. Indeed, between 25% and 50% of the operational costs of traditional wastewater treatment facilities can be attributed to the electrical demand needed across the entire treatment system. And in traditional wastewater treatment facilities using activated sludge processes, the aeration system can account for between 50% to 70% of the total energy consumed at the facility.

Seeking to optimize and increase the effluent treatment capacity of wastewater treatment facilities, including municipal sewage treatment facilities, an innovative technology is disclosed herein relating to the transfer of oxygen to the wastewater influent, thereby replacing traditional air blower systems needed for the aeration of aerobic processes. In this gas infusion oxygenation system and process, gases such as dissolved nitrogen and carbon dioxide are removed from the liquid medium, or wastewater effluent and replaced with oxygen, thereby creating a stable oxygenated effluent. By replacing dissolved nitrogen, $CO_2$, and other gasses with dissolved oxygen ($O_2$), the effluent reaches levels of supersaturation, significantly increasing the aeration process capacity and efficiency.

A gas infusion system described herein can include an oxygen generator and a gas infusion module (e.g., multiple gas infusion modules) for introducing oxygen into the wastewater effluent. The oxygen generator concentrates oxygen from the atmosphere to levels above ambient conditions and supplies the concentrated oxygen to the gas infusion module (e.g., to the multiple gas infusion modules) within the gas infusion system. Each gas infusion module can include one more hollow tube microporous fibers. The concentrated oxygen is supplied under pressure to the hollow tube fibers or tubes in the gas infusion module and the oxygen is diffused or transferred to the wastewater influent which surrounds the microporous fibers. The oxygen is transferred to the wastewater influent in a manner free of bubbles (e.g., in a bubbleless manner) and at oxygen concentration levels above traditional air blower or bubbler systems, as further described below.

Figure 2:
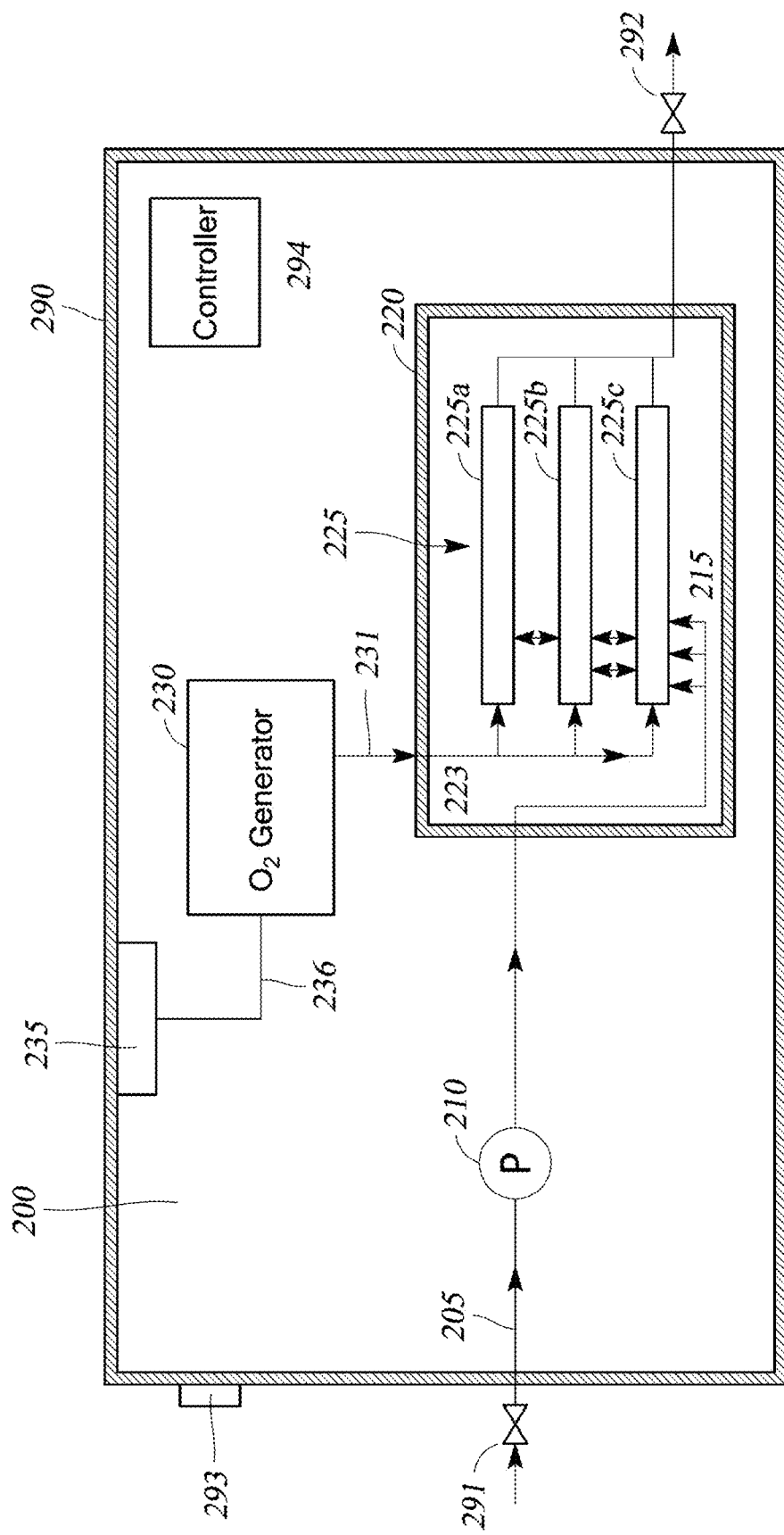
FIG. 2 is a flow diagram of a wastewater treatment system.

FIG. 2 illustrates a single stage gas infusion unit 200 suitable to replace a traditional aeration system in a wastewater treatment facility. Gas infusion unit 200 may be a modular system and can include: a housing 290, such as a modified 20 foot or 40 foot standard shipping container; a wastewater influent supply connection 291; an oxygenated wastewater output connection 292, one or more electrical power connections 293, a system control 294 (e.g., controller); a wastewater influent supply line 205, a supply feed pump 210, a gas infusion system 220 (oxygen infusion system) having one or more oxygen infusion modules 225 (e.g., oxygen infusion modules 225a, 225b, 225c), for example housing in a housing, such as a tank, and an oxygen source. In one implementation, the oxygen source is an oxygen generator 230. In another implementation, the oxygen source is an oxygen supply tank. Advantageously, the gas infusion unit 200 is a standalone unit that can be transported as a single unit to a wastewater treatment facility, thereby facilitating its transportation and incorporation in a wastewater treatment facility. In one implementation, the system control 294 (e.g., controller) can control one or both of the flow of oxygen from the oxygen generator 230 to the oxygen infusion modules 225 and the flow of wastewater from the wastewater supply line 205 to the oxygen infusion modules 225.

Wastewater influent is received as input to the gas infusion unit 200 from a wastewater treatment facility, such as from a primary clarifying tank, anaerobic tank, or directly from a bar screening or grit removal tank (not shown). In another implementation, further described below, influent is received as an input to the gas infusion system 200 from an aeration tank of the wastewater treatment facility. Wastewater influent enters the gas infusion system 200 through the influent supply connection 291 and flows through the wastewater supply line 205 and via the supply feed pump 210 into the gas infusion system 220.

The oxygen generator 230 supplies oxygen at 70% to 95% purity, for example 92% purity—significantly greater than atmospheric oxygen levels of approximately 21% in air supplied from traditional air blower systems used in wastewater treatment facilities—to the gas infusion system 220 via an oxygen supply line 231. Atmospheric air may be collected directly from the surrounding environment by the oxygen generator 230, or may be collected through an air intake 235 and supplied to the oxygen generator 230 via an air supply duct 236.

The gas infusion system 220 can include one or more gas infusion modules 225 for saturating the wastewater influent with oxygen received by the gas infusion module(s) 225 via the oxygen supply line 231. Each gas infusion module 225 includes a plurality of hollow tubes or microporous fibers having a plurality micropores with a pore diameter sufficient to allow transfer of the concentrated oxygen to the wastewater influent in a manner free of bubbles (e.g., in a bubbleless manner).

In another implementation, wastewater influent is supplied by influent feed pump 210 through influent supply line 205 and into an influent manifold 215, which supports various arrangements of gas infusion modules 225 from single modules to an array of 2 or more modules (e.g., 2, 3, 4, 5, 6, 7, 8, or more gas infusion modules 225, arranged in parallel) within the gas infusion system 220. The oxygen generator 230 supplies concentrated oxygen through the oxygen supply line 231 into a gas manifold 223, which supports oxygen supply to each of the gas infusion modules 225 in the specific array of modules within the gas infusion system 220.

In another implementation, further discussed below, two or more gas infusion modules 225 are arranged in series, wherein wastewater influent is supplied by influent feed pump 210 through influent supply line 205 and into an influent manifold (not shown), which supports various arrangements of gas infusion modules 225 arranged in series, such as depicted 225*a* and 225*b* in FIG. 2, within the gas infusion system 220. In such an arrangement, oxygen saturated wastewater influent flows from gas infusions module 225*a* and into gas infusion module 225*b* where it is further saturated with oxygen. The oxygen generator 220 supplies concentrated oxygen through the oxygen supply line 231 into a gas manifold (not shown), which supports oxygen supply to each of the gas infusion modules 225*a* and 225*b* in the specific array of modules within the gas infusion system 220.

Figure 13:
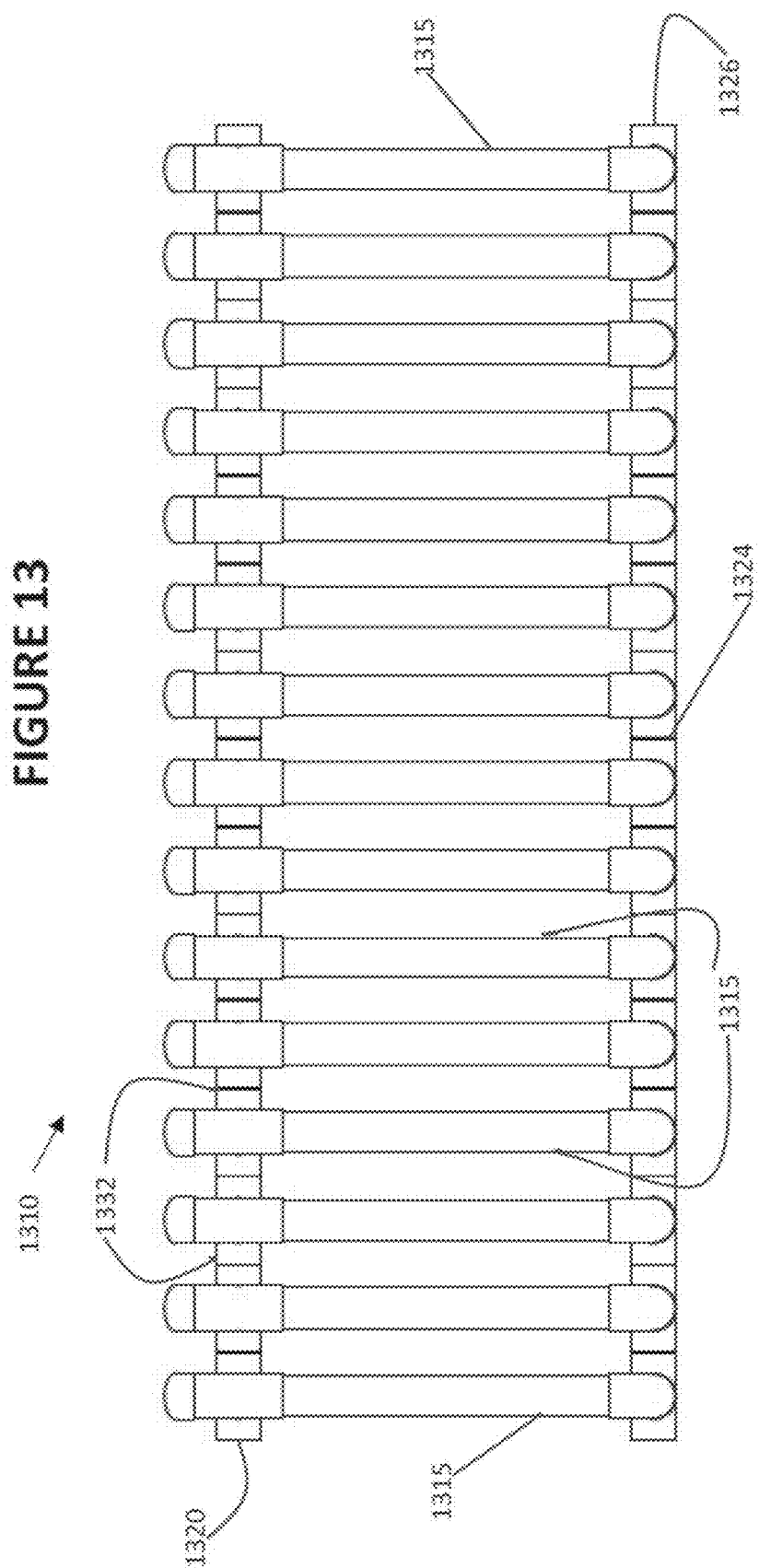
FIG. 13 is a side view of an array of gas infusion modules arranged in parallel.
Figure 14:
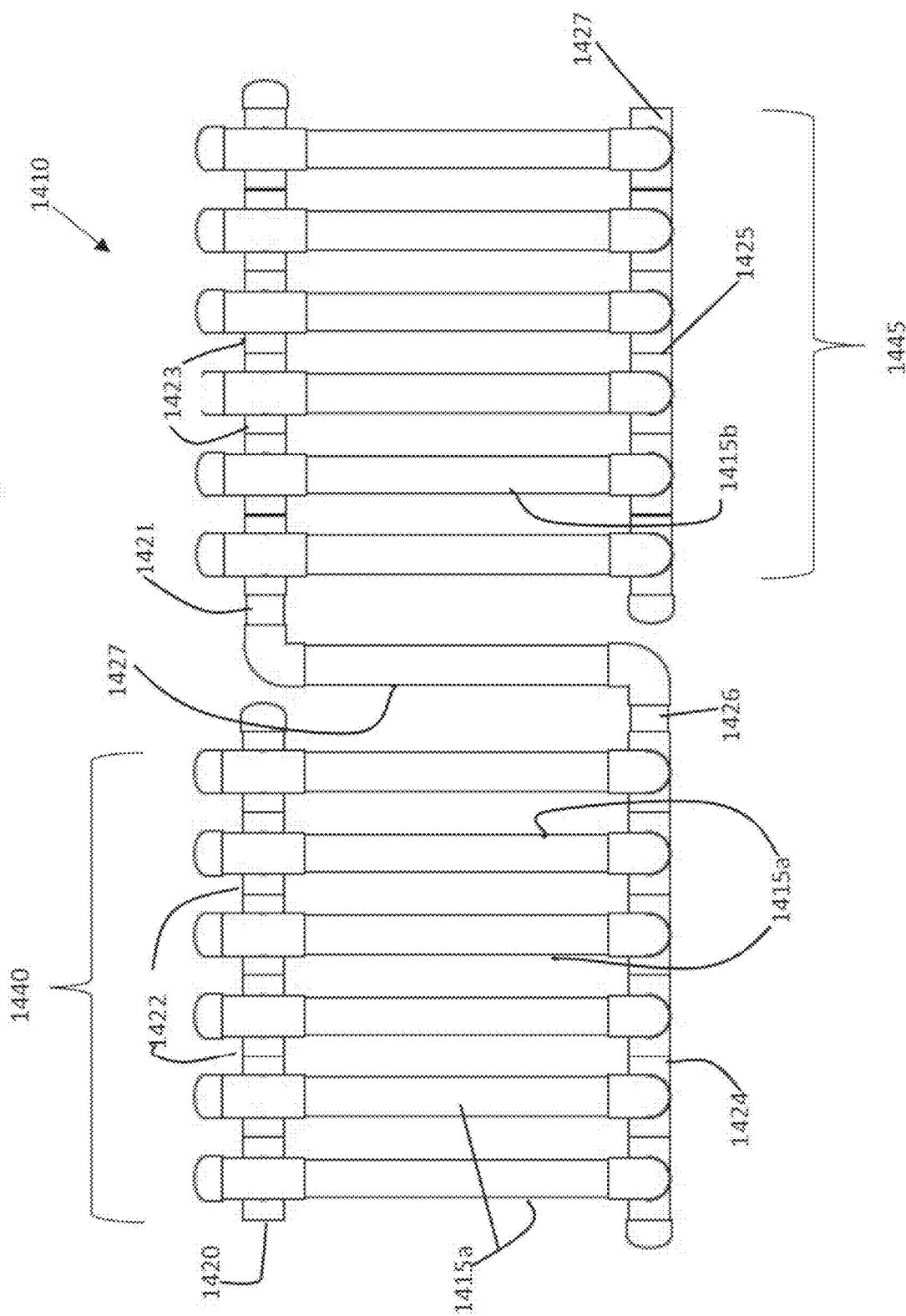
FIG. 14 is a side view of an array of gas infusion modules arranged in parallel and series

It will be appreciated that any arrangement of gas infusion modules 225 may be provided within gas infusion system 220, from an arrangement of single module use, to multiple modules arranged in parallel (as shown in FIG. 13), to multiple modules arranged in series, and even multiple modules arranged in a combination of parallel and series (as shown in FIG. 14), depending on the oxygenation needs of the specific wastewater treatment facility.

In some implementations, two stages of gas infusion can be used to supersaturate the wastewater with oxygen. The first stage can saturate wastewater influent flowing into an aeration tank with dissolved oxygen. The second stage can saturate mixed liquor from the aeration tank with dissolved oxygen and recirculate the saturated wastewater back to the aeration tank.

In the first stage, oxygen generators collect atmospheric air (with approximate 21%-23% oxygen) and concentrate oxygen from the collected air to supply the concentrated oxygen to a gas infusion module(s) in communication with the wastewater influent. The oxygen generators concentrate oxygen at levels including: concentrated oxygen at levels of 90% or more, 80% or more, 70% or more, 60% or more, or at levels greater than ambient atmospheric oxygen levels and up to 90% or more concentrated oxygen. Concentrated oxygen may be supplied from the oxygen generator to the gas infusion module(s) at levels of 80%, 81%, 82%, 83%, 84%, 85%, 86%, 87%, 88%, 89%, 90%, 91%, 92%, 93%, 94%, 95%, 96%, or greater than 97% oxygen.

Microporous hollow core fiber membranes, transfer the concentrated oxygen to the wastewater influent. Each microporous hollow fiber membrane includes numerous micro pores that produce a stable interface for transferring the oxygen to the wastewater influent without the creation of bubbles in the influent. Introduction of the concentrated oxygen directly to the influent through the microporous fiber membranes provides for an oxygen supersaturated fluid without the use or need for air blowers or blower systems as used in traditional aeration systems.

Traditional blower systems are used to create air bubbles in the wastewater to provide available oxygen to the microorganisms. The gas infusion unit having one or more gas infusion modules transfers oxygen to the effluent without the creation of bubbles to provide for a much more efficient and higher level of oxygenation of the wastewater. This allows longer periods of oxygen retention in the effluent and throughout the aeration tanks (or biological reactors) in the wastewater treatment plant, thereby providing a longer period of oxygen exposure for the microorganisms in the wastewater aeration (or oxygenation) phase.

Due to the absence of air or oxygen bubbles in the oxygen saturated wastewater, the dissolved oxygen experiences a Brownian molecular movement, and the dissolved oxygen is not released because it does not break the surface tension of the water. In addition, because the oxygen is dissolved, assimilation of microorganisms is also facilitated by increasing the process capacity.

By using a direct gas infusion oxygenation system as described herein, where the efficiency of transferring the oxygen to the effluent is greater than traditional air blower systems, less energy consumption and, consequently, lower operating costs are advantageously obtained in sewage treatment plants. Thus, it becomes possible not only to reduce the operating costs of wastewater treatment plants, but also better allocate energy resources while providing cleaner water.

In addition, with the increase in efficiency of the gas transfer processes for the consumption of organic matter from the sewage, expansion of treatment capacity is advantageously possible without increasing the physical size of the wastewater treatment facility. Achieving the ability to treat an increase in flow within the same footprint of the wastewater facility, also reduces capital expenditures associated with adding additional wastewater treatment tanks and blower systems to treat more flow at a wastewater facility due to population increases. Similarly, the expansion of capacity may also facilitate treatment of surge or irregular sewage treatment needs without adding to the physical plant structure.

In one implementation, a gas infusion system having a wastewater flow capacity of 1 l/s (one liter per second) was installed as a side stream to an existing wastewater treatment facility. The results from the test facility demonstrate that:

(1) gas infusion systems consistent with embodiments described herein eliminate the need for expensive, inefficient, and bulky blower aeration systems;

(2) with the elimination of blower systems, blower houses and other acoustic accommodations for the blower equipment are not needed;

(3) CPVC (chlorinated polyvinyl chloride) pipes can replace the typical stainless steel pipes required by blower systems; and (4) high cost, and maintenance intensive air diffusers, used for the formation of small or microbubbles from the blower supplied air, are not needed.

Indeed, utilizing high efficiency gas infusion technology as disclosed herein, high efficiency removal of carbonaceous organic matter and nitrification can be achieved with energy reductions that can reach between 30% and 90% of that observed in conventional systems. In some implementations, high efficiency gas infusion devices used as an alternative to traditional blower systems in wastewater treatment facilities achieve an energy reduction over the traditional system of 30% or more, 35% or more, 40% or more, 45% or more, 50% or more, 55% or more, 60% or more, 65% or more, or greater than 70% (e.g., 75%, 80%, 85%, 90%).

Figure 3:
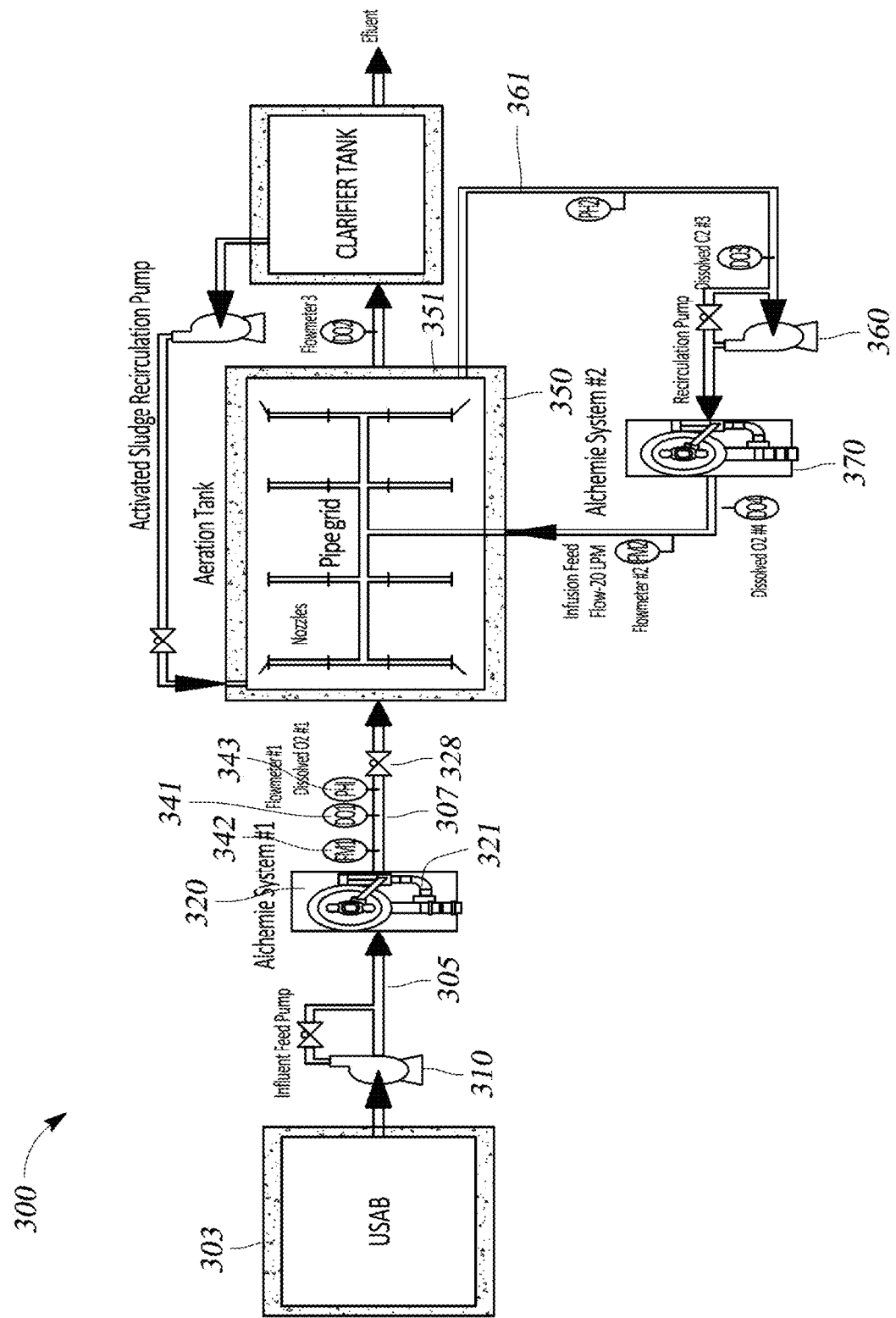
FIG. 3 is a flow diagram of a wastewater gas infusion system.

FIG. 3 illustrates one implementation, where two gas infusion systems are installed in the wastewater stream, the first promoting oxygenation of the wastewater influent from the wastewater treatment facility entrance (e.g., after primary clarification) and the other promoting the oxygenation of mixed liquor from the aeration tank, which recirculates back to the aeration tank. In such an arrangement, levels of between 30 mg/L of oxygen and 55 mg/L of oxygen in the inlet influent can advantageously be obtained. In some embodiments, utilizing a gas infusion unit disclosed herein in the inlet effluent can reach oxygen levels of: 30 mg/L to 35 mg/L of oxygen; 35 mg/L to 40 mg/L of oxygen; 40 mg/L to 45 mg/L oxygen; 45 mg/L to 50 mg/L oxygen; and 50 mg/L oxygen or above (e.g., 55 mg/L of oxygen). Furthermore, utilizing a second oxygen infusion unit to infuse mixed liquor from the aeration tank and recirculated to the aeration tank can produce oxygen levels above 55 mg/L oxygen in the recirculated effluent stream. In some embodiments, utilizing a gas infusion unit disclosed herein in the mixed liquor stream from the aeration tank can produce oxygen levels in the recirculated effluent stream of 30 ppm to 45 ppm.

The above oxygen saturation levels of the wastewater at the aeration stage of treatment were achieved utilizing a system including: an effluent recirculation pump, a 60-liter gas infusion pressure chamber with an array of six gas infusion modules, each having microporous hydrophobic hollow-fiber membranes. The microporous hydrophobic hollow-fiber membranes were supplied with 85% to 95% pure oxygen gas (e.g., 85%, 86%, 87%, 88%, 89%, 90%, 91%, 92%, 93%, 94%, 95% pure oxygen gas) generated by an external oxygen generator operating at a pressure of 22 Psi. The oxygen feed from the oxygen generator is the gas source of the oxygen infusion process that occurs within the gas infusion pressure chamber. It will be appreciated that other oxygen sources may be utilized in place of an oxygen generator (in the implementations described herein), including pressurized oxygen from a tank or other pressure vessel.

As illustrated in FIG. 3, a wastewater treatment system 300 utilizes embodiments of the gas infusion system described herein, and for example, may include a first metering feed pump or influent feed pump 310 to direct a portion of the wastewater plant's primary influent from the anaerobic treatment tank or Upflow Anaerobic Sludge Blanket (UASB) 303 via influent supply line 305. The influent flow is pumped into the first gas infusion system 320 at a rate of, for example, 25-35 liters per minute (l/min or LPM). The first gas infusion system 320 can have a gas infusion pressure chamber or housing 321. The influent is circulated within the housing 321 through an eductor (not shown) positioned at the center of the six module array of gas infusion units. The eductor directs the influent across the microporous hydrophobic hollow fiber membrane in a co-current manner, or alternatively a countercurrent manner, allowing for the mass-transfer of oxygen from a gas phase into an aqueous phase and saturation into the influent, while simultaneously achieving a mass-transfer of nitrogen from the aqueous phase to the gas phase where the gaseous nitrogen is vented out of the pressure vessel via a pressure release valve on the gas infusion pressure chamber 321.

The level of dissolved oxygen achieved within the influent in the gas infusion pressure chamber 321 is in excess of 100 ppm (e.g., between 100 ppm and 330 ppm, inclusive), in excess of 200 ppm, in excess of 300 ppm, and in some embodiments, in excess of 330 ppm. This level of highly-oxygenated influent is achieved by dissolving the oxygen molecules in a substantially bubble-free gas transfer process. As used herein "bubble-free gas transfer" or "free of oxygen bubbles" means that 70% or greater (e.g., 90% or more) of the oxygen dissolved in the influent is transferred without the creation of bubbles.

In the embodiment depicted in FIG. 3 a total gas pressure of between 15 psi to 22 psi is maintained within the gas infusion pressure chamber 321 by restricting the outgoing wastewater flow from the gas infusion pressure chamber 321 to an outflow rate of at least 25 LPM, (e.g., 25 LPM, 26, LPM, 27 LPM, 28 LPM, 29 LPM, 30 LPM, 31 LPM, 32 LPM, 33 LPM, 34 LPM, or 35 LPM or greater). In some embodiments restricting the outgoing flow may be achieved by providing an outlet pipe (not shown) from the gas infusion pressure chamber 321 with a smaller diameter than the inlet pipe 305 diameter from the influent feed pump 310. Alternatively, the total gas pressure within the gas infusion pressure chamber 321 may be maintained between 15 psi and 22 psi, or at levels greater than 22 psi utilizing a small compressor in series with the oxygen generator (not shown) or utilizing a higher capacity or higher pressure oxygen generator. The outgoing flow rate from the gas infusion pressure chamber 321 may be restricted by adjusting one or more metering valves 328 in the outlet stream.

The first gas infusion system 320 pumps the highly-oxygenated influent from the first gas infusion system 320 in a bubble-free manner through a supply pipe 307 that contains an inline dissolved oxygen meter 341, an inline flow meter 342, an inline pH meter 343, and other sensors, such as pressure and temperature sensors. Data that measures dissolved oxygen, flow rate, pH and other operating conditions of the highly oxygenated wastewater from the first gas infusion unit 320 may be fed to a control unit (not shown) and used to adjust and maintain the targeted or desired oxygen levels and flowrates of the highly oxygenated effluent. Over-oxygenating the incoming wastewater helps the wastewater treatment as it facilitates the breakdown of some long chain organic compounds and also the refractory organic compounds. The data from the various sensors can be collected by a programmable logic controller (PLC) that provides real-time data accessible by an automated control module, onsite personal or remote monitoring over a network.

In the example embodiment depicted in FIG. 3, the highly oxygenated influent flows in a continuous manner at a flowrate of between 25 LPM and 35 LMP (inclusive), for example 30 LPM, into the inlet of the aeration tank 350. The aeration tank 350 in the present example may have a volume of approximately 26 cubic meters of wastewater with an operating retention time of 7.2 hours (considering an inlet flow of 30 LPM on average in addition to the recirculation of activated sludge or RAS from the bottom of the clarifier to the aeration tank). The incoming highly-oxygenated wastewater is pumped into the aeration tank 350 through an open ended supply pipe 307 whereby the highly-oxygenated wastewater is released below the surface of the wastewater in the aeration tank 350, for example below the surface by as much as two-thirds the depth of the tank (e.g., in a 3 meter tall tank, the highly-oxygenated wastewater is released into the aeration tank 350 at a depth of 2 meters below the surface). Introducing the highly-oxygenated wastewater well below the surface of the aeration tank promotes agitation and continued suspension of the organic matter in the aeration tank and maintains the saturation of the oxygen in the effluent. The highly oxygenated levels of dissolved oxygen are maintained in the aeration tank at a range of 2 ppm to 3 ppm (inclusive) for the purpose of being utilized by the microorganisms in an activated sludge aerobic treatment process where aerobic bacteria in the presence of oxygen, oxidize carbonaceous matter, ammonia nitrogen matter, drive off entrained gases, generate a biological floc that facilitates settlement of suspended solids and generates a mixed liquor with 100-200 ml/L of sludge after a 30 minute settling test.

Concurrently, effluent from the aeration tank 350 is recirculated through effluent recirculation supply line 361 by recirculation pump 360 in a closed loop from the outflow end 351 of the aeration tank 350 and recirculated to a second gas infusion system 370 for the purpose of further dissolving additional kilograms of oxygen into the wastewater effluent stream within the aeration tank 350. The recirculated stream uses recirculation pump 360 to recirculate wastewater effluent into the second gas infusion system 370 where the effluent is oxygenated again in the same manner as described with the first gas infusion system 320.

In this secondary oxygenation process the effluent may achieve a dissolved oxygen saturation level in the range of 30 ppm to 45 ppm.

Figure 4:
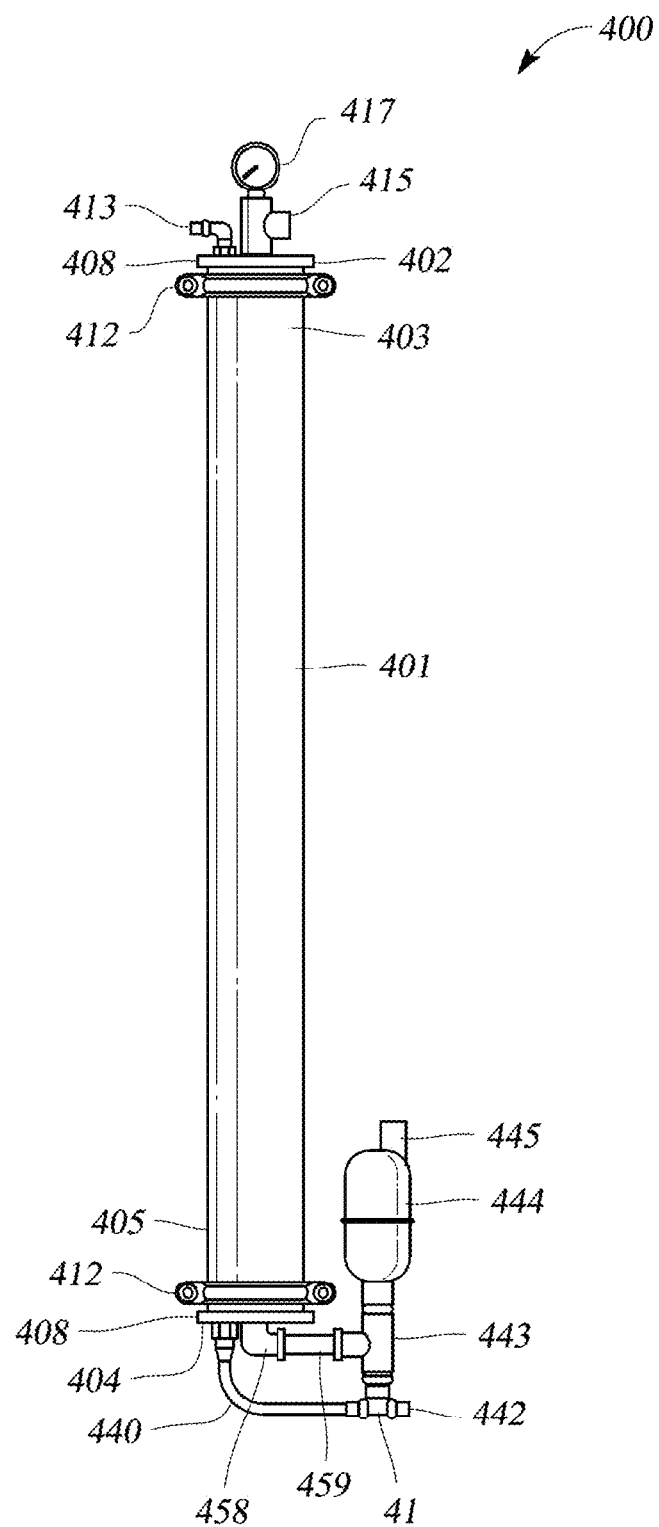
FIG. 4 illustrates a side view of a gas infusion module.
Figure 5:
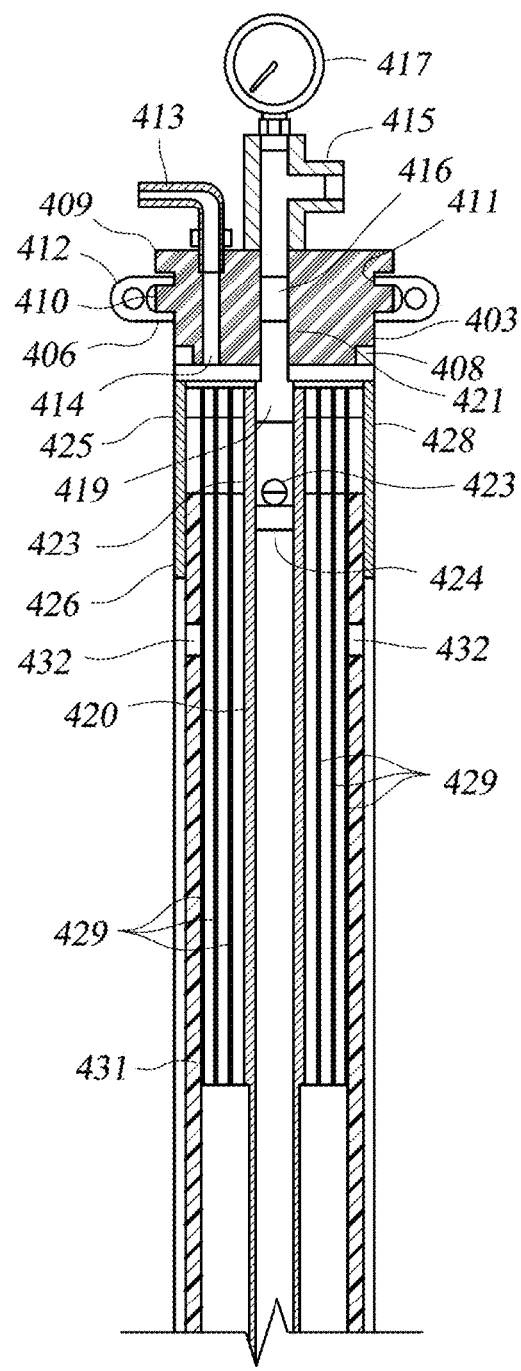
FIG. 5 illustrates a longitudinal cross-sectional view of an upper portion of a gas infusion module.
Figure 6:
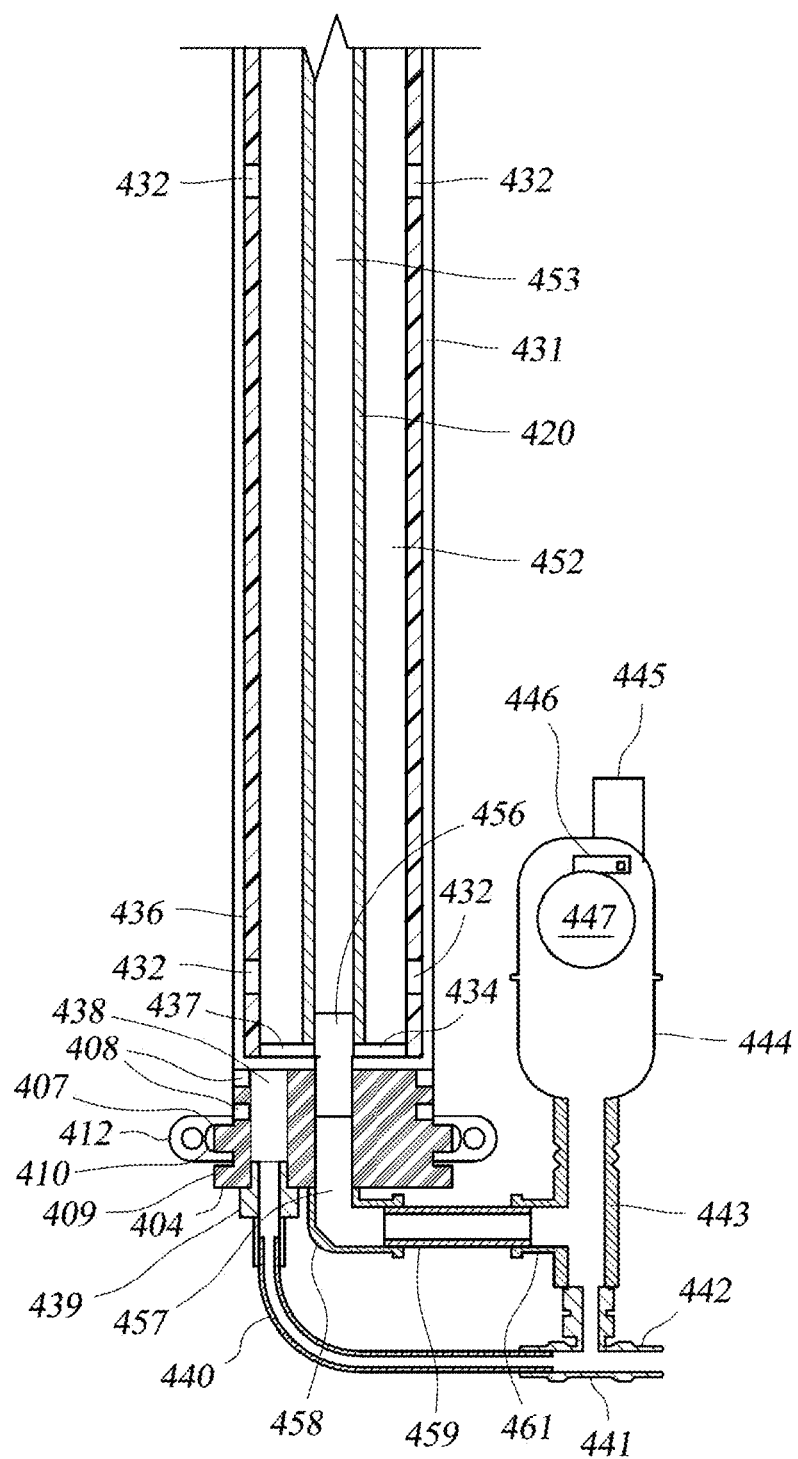
FIG. 6 illustrates a longitudinal cross-sectional view of a lower portion of a gas infusion module.
Figure 7:
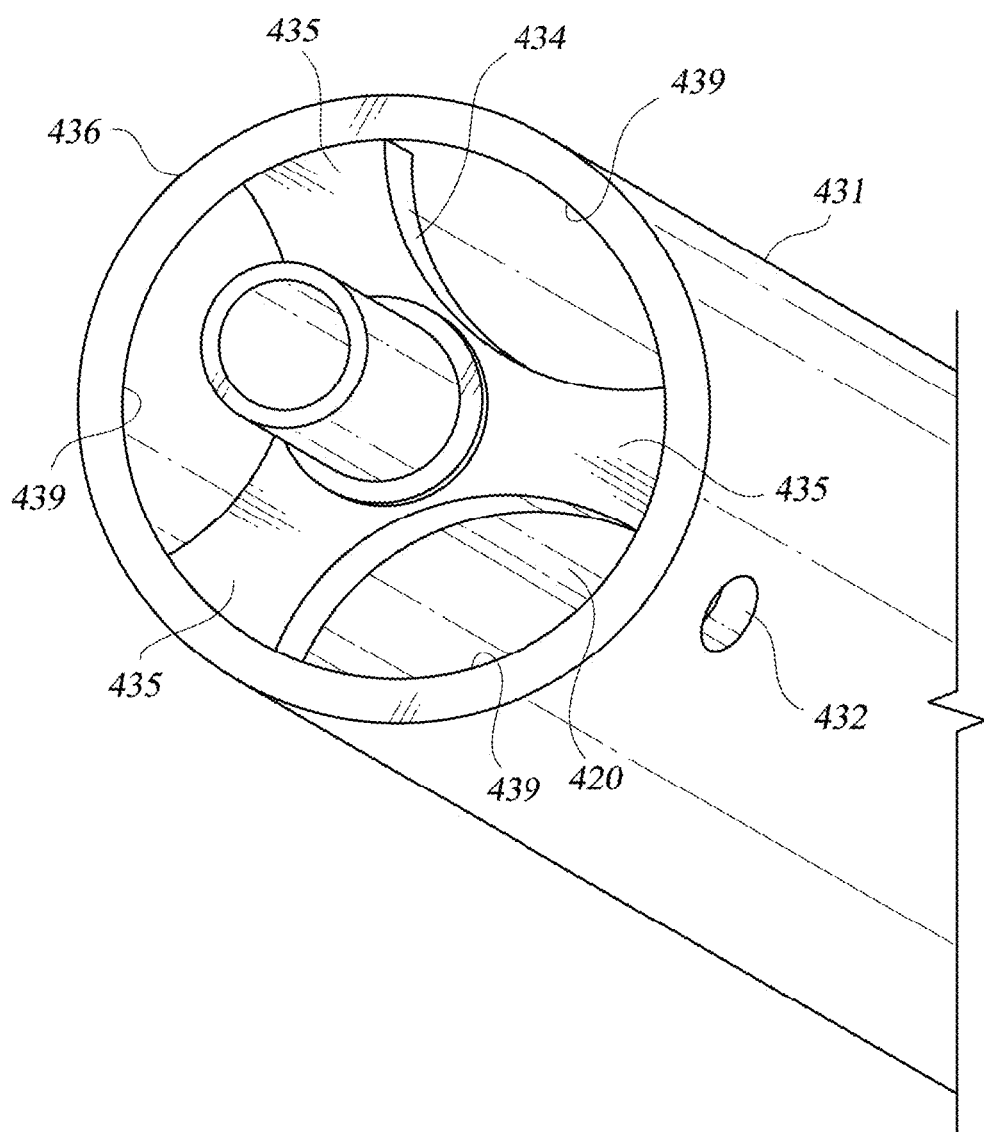
FIG. 7 is an isometric view of the bottom end of a barrel and central tube in the gas infusion module of FIGS. 4 to 6.

FIGS. 4 to 6 show one implementation of a gas infusion module 400. The gas infusion module 400 includes a thin-walled, tubular, housing 401 (e.g., of stainless steel or another suitable material, such as another metal) with an inlet plug 402 in the top end 403 and an outlet plug 404 in the bottom end 405 thereof. Flanges 406 and 407 are provided on the top and bottom ends 403 and 405, respectively, of the housing 401. The plugs 402 and 404 are sealed in the housing 401 by O-rings 408. The plugs 402 and 404 are identical, each including a pair of spaced apart flanges 409 and 410 with an annular groove 411 therebetween. The flanges 410 act as seats for two-piece clamps 412, which clamp the plugs 402 and 404 in and to the housing 401. It will be appreciated that various material can be used for the gas infusion module components including PVC (polyvinyl chloride) and CPVC (chlorinated polyvinyl chloride), or other suitable materials.

Concentrated oxygen from an oxygen generator or an oxygen supply tank is introduced into the top end 403 of the housing via an elbow 413 and an inlet passage 414 in the plug 402. Wastewater is introduced into the housing 401 via a T-coupling 415 and an inlet passage 416 in the center of the plug 402. A pressure gauge 417 that is mounted on the T-coupling 415 monitors the pressure of wastewater entering the housing 401.

Wastewater entering the inlet passage 416 flows through a short coupler 419 into a central tube 420 or core extending substantially the entire length of the housing 401.

The top end of the coupler 419 is sealed in the plug 402 by o-rings 421. The wastewater is discharged from the tube 420 through four ports 423 into the housing 401. A plug 424 in the tube 420 beneath the ports 423 prevents the wastewater getting past the ports. The top end of the tube 420 extends through and is connected to an epoxy resin disc 425, which is mounted in the top end of a CPVC sleeve 426. The sleeve 426 is sealed in the housing 401 by an O-ring 428.

A plurality of hollow, microporous fibers 429 of the type described in U.S. Pat. No. 7,537,200, which issued to Craig L. Glassford on May 26, 2009, and is incorporated herein by reference in its entirety and for all purposes, extend through and are suspended from the disc 425. The illustration of the fibers 429 in FIG. 5 is merely schematic. In an example implementation, an approximately 40 inch long housing 401, may include as many as 5,600 fibers 429, each having a length of 14 inches and an outside diameter of 0.54 mm. The fibers 429 have a liquid repellent (e.g., hydrophobic) outer surface. A CPVC barrel 431 is mounted in and extends downwardly from the sleeve 426. The barrel 431 is spaced apart from the housing 401. Openings 432 in the barrel 431 permit wastewater to enter the space between the housing 401 and the barrel 431.

The bottom end of the central tube 420 extends through and is supported by a trefoil base 434 (see FIG. 6), the arms 435 of which are connected to the open bottom end 436 of the barrel 431. Gaps 437 between the arms 435 provide outlets from the barrel 431 for wastewater. Wastewater discharged from the barrel 431 passes through an outlet passage 438 in the bottom plug 404, a coupling 439 and a tube 440 (e.g., of polyethylene or other suitable material) to a T-coupling 441. The gas saturated wastewater is discharged through one arm 442 of the coupling 441. Undissolved gas from the wastewater entering the coupling 441 passes through another T-coupling 443 to a tank 444 for discharge through a gas vent valve 445. Opening and closing of the valve 45 is controlled by a lever 446 in the tank 444 operated by a float 447.

Undissolved gas in a sump area 452 beneath the fibers 429 passes through a small orifice 453 (see FIG. 6) in the central tube 420 below the area in the barrel 431 containing the microporous tubes 429. The orifice 453 acts to control the level of undissolved gas and the wastewater level in the barrel 431. The orifice 453 also prevents gas from exiting the wastewater outlet passage 439 with the wastewater by venting a controlled quantity of gas while simultaneously controlling the level of the gas/liquid interface in the apparatus. The gas density is lower than that of the wastewater and preferentially passes through the orifice 453. In testing, it has been observed that the wastewater may not be able to contain all of the gas in solution at this point, and excess gas which is not completely dissolved in the wastewater will exit through the orifice 453.

Gas entering the central tube 420 through the orifice 453 is discharged through a short coupling 456, which connects the tube 420 to an outlet passage 457 in the bottom plug 404. The gas flows through the passage 457, and elbow 458 and a pipe 459 to the third arm 461 of the T-coupling 443.

In operation, wastewater from a source thereof enters the gas infusion module 400 via the T-coupling 415, inlet passage 416, coupler 419 and the central tube 420. The wastewater is discharged from the tube through the four ports 423 and is distributed over the external surfaces of the microporous hollow fibers 429. At the same time, gas enters the apparatus via the elbow 413 and the inlet passage 414. The gas flows into the open top ends of the microporous hollow fibers 429 while the wastewater is being distributed over the external surface of the fibers 429 in a co-current direction with the gas. The wastewater continues to be in contact with the gas escaping through pores (not shown) in the microporous fibers 429, whereby the wastewater collects gas into solution as it travels downwardly in the barrel 431. When the wastewater exits the area of the barrel 431 containing the fibers 429, it enters the sump area 452 (see FIG. 6) where excess gas which is not completely dissolved coalesces and collects in the center of the barrel 431. The gas saturated wastewater is discharged through the outlet passage 439 in the plug 404, the tube 440 and the T-coupling 441.

When wastewater is initially introduced into the gas infusion module 400, the gas infusion module 400 is completely filled with ambient air. The air is vented through the tank 444 and the valve 445 by the introduction of wastewater into the system. The wastewater rises in the tank 444 to close the valve 445 preventing wastewater from escaping. The orifice 453 in the central tube 420 maintains equilibrium of the gas/liquid in the area of the microporous fibers 429 and the bottom area of the barrel 431 which contains higher levels of gas saturation than the top of the barrel.

Gas entering the orifice 453 and the valve 445 after the apparatus reaches an equilibrium state leaves wastewater that may contain less gas which allows more soluble gas to be infused into the wastewater. The gas outlet T-coupling 443 allows wastewater collected by the orifice 453 to re-enter the main water outlet stream passing through the coupling 441 and vents gas coming out of solution due to turbulence in the wastewater outlet. Moreover, the T-coupling 443 prevents hydraulic locks in the tank 444 by connecting the tank 444 to the wastewater stream flowing through the coupling 441. The tube 440 through which wastewater is discharged from the apparatus is sized to allow a specific amount of pressure to be held in the gas infusion apparatus at a specific flow rate. The tube 440 facilitates laminar flow to minimize (e.g., eliminate) any sheer caused by any restriction caused by the outlet passage 438 and its associated coupling 439. Sheering causes dissolved gases to come out of solution which is undesirable.

It will be noted that central tube 420, the sleeve 426, the barrel 431 and the contents of the barrel can be formed as a module, which can be removed from the housing 401 by removing the clamps 412 for quick disassembly (e.g., to facilitate maintenance of the gas infusion module 400).

It will further be noted that in some implementations one or more gasses can be introduced to the apparatus (gas infusion module 400) either sequentially or as a mixed gas. For example, oxygen may be introduced to the apparatus (gas infusion module 400) followed by introducing nitrogen to the apparatus (gas infusion module 400). In such a manner, a fluid or wastewater may be supersaturated with oxygen, held for a desirable time period, and the oxygen may then be displaced by subsequently supersaturating the oxygenated fluid with nitrogen.

The microporous structure within each gas infusion module (e.g., the microporous hollow fibers 429) may include a microporous hydrophobic hollow fiber membrane having a pore pathway diameter of about 0.01 µm to about 5 µm ("micromembrane"). The micromembrane may have a plurality of pores, wherein the pore pathway diameter is equal to or less than 0.05 µm, equal to or less than 0.10 µm, equal to or less than 0.15 µm, equal to or less than 0.20 µm, or equal to or less than 0.25 µm. Microporous structures and micromembranes are described in U.S. Pat. Nos. 6,209,855 and 7,537,200, the entire contents of each of which is hereby incorporated herein by reference for all purposes.

Figure 8:
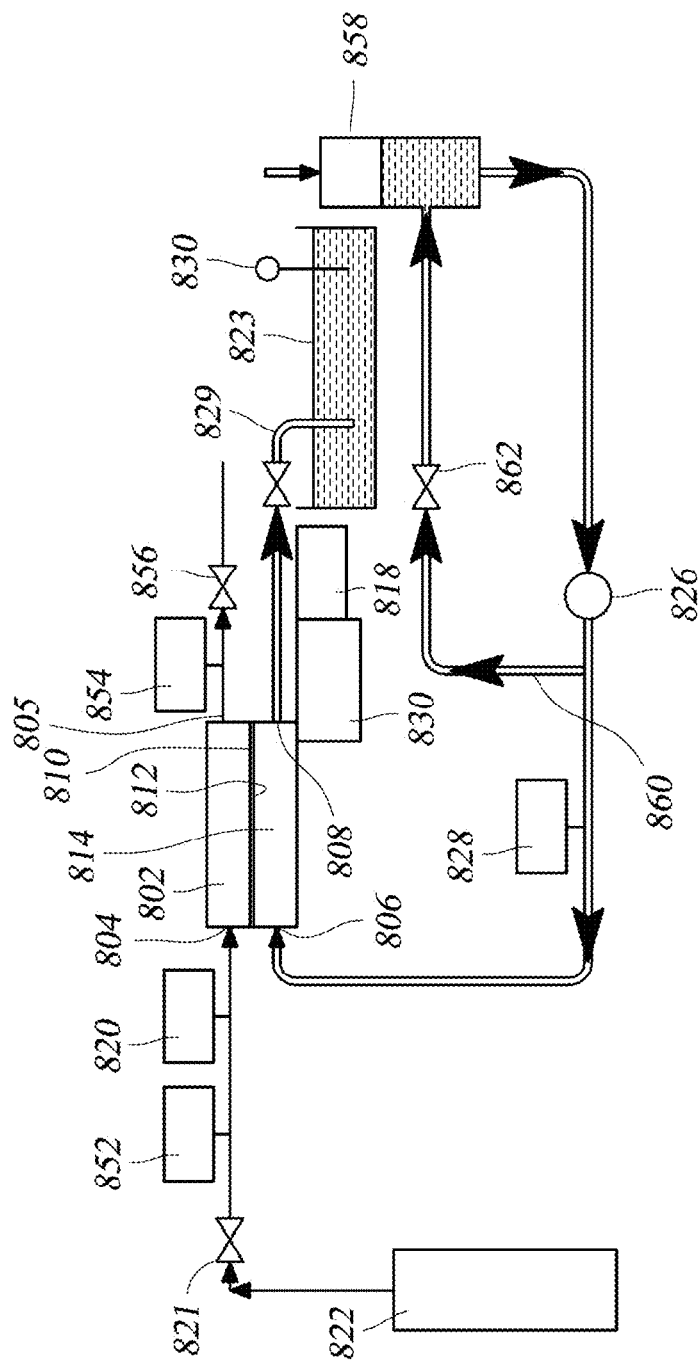
FIG. 8 is a flow diagram of a system for gas infusion in a liquid.

FIG. 8 illustrates an example gas/liquid mixing apparatus, including:
a) a casing 802 having a gas inlet 804, a liquid inlet 806 and a gas/liquid mixture outlet 808,
b) a microporous membrane 810 in the casing 802, the microporous membrane 810 having,
  i) effective, gas/liquid contacting, pore pathway diameters generally, in the range 0.01 µm to 5 µm, and
  ii) a side 812 that is repellent to the liquid to be mixed, the microporous membrane 810 dividing the casing interior 814 into a liquid path, on the water repellent side 812, between the liquid inlet 806 and the gas/liquid mixture outlet 808, and a gas chamber from the gas inlet 804,
c) a fluid pressure regulator connected to the casing 802, comprising a liquid back pressure regulator and gauge 818, and a gas pressure regulator and gauge 820, for regulating the gas/liquid pressure relationship in the casing 802 so that,
  i) the gas pressure does not exceed the liquid pressure, and
  ii) pressurized liquid does not pass through the membrane micropores, and
d) a low-liquid-turbulence incurring gas/liquid mixture conveying and delivery device, in the form of a pipe 829, having a rounded corner and connected to the gas/liquid mixture outlet 808 and terminating below a liquid level 823 of a tank 824 to gently deliver gas/liquid mixture thereto.

The apparatus may also include gas outlets 805 for removing any liquid that may collect in the gas chamber 802. The gas outlet 805 is also useful for connecting two or more casings 802 in series flow.

The apparatus shown in FIG. 8 may further include a gas valve 821, a high pressure oxygen cylinder 822, the open-topped, gas/liquid mixture tank 824, forming a receiving vessel for gas/liquid mixture, a variable speed liquid pump 826, a liquid pressure regulator and gauge 828, and a dissolved oxygen analyzer 830. Gas flow meters 852 and 854 may be provided together with a gas valve 856. The liquid feed may be supplied from tank 858 and accurately controlled by return line 860 and valve 862. In the context of wastewater treatment, tank 858 may be the aeration tank of a wastewater system or the UASB In FIG. 9, similar parts to those shown in FIG. 8 are designated by the same reference numerals and the previous description is relied upon to describe them.

Figure 9:
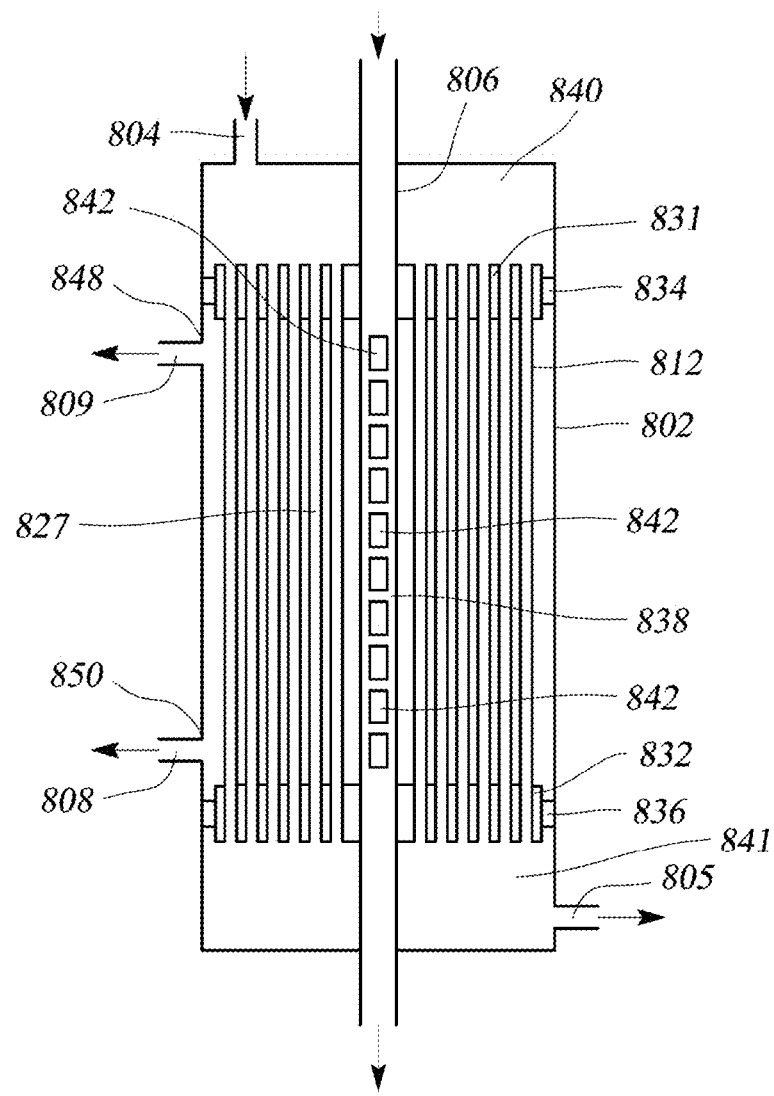
FIG. 9 is a schematic side view of a device for housing the microporous membrane for the transfer of a gas to a liquid.

In FIG. 9, the microporous membrane 810 comprises one of a bundle of hollow, microporous fibers 827, each with a liquid repellent outer side 812 and sealed in epoxy resin discs 831 and 832, which, in turn, are sealed in the casing 802 by 'O'-rings 834 and 836 respectively. The assembly comprising the bundle of microporous fibers 827 and discs 831 and 832, are supported by a central support tube 838 which is sealed in the casing and spaces the discs 831 and 832 to provide plenum chambers 840 and 841. Plenum chamber 840 receives gas from inlet 804, while plenum chamber 841 passes gas to outlet 805 to the flow meter 854.

The upper ends of the microporous fibers 827 have exposed, open ends above the disc 831, to the plenum chamber 840.

The lower ends of the microporous fibers 827 have exposed, open ends below the disc 832 to the plenum chamber 841.

The central support tube 838 provides the liquid inlet 806 and has liquid outlet ports 842 to the portion of the interior of the casing 802 between the discs 831 and 832.

The gas/liquid mixture outlet 808 is one of two, similar outlets, the other one being designated by reference numeral 809. Both of the outlets 808 and 809 are connected to the pipe 829 (FIG. 9).

In other embodiments, either outlet 808 or 809 is used to recirculate gas/liquid mixture for further gas enrichment.

Figure 10:
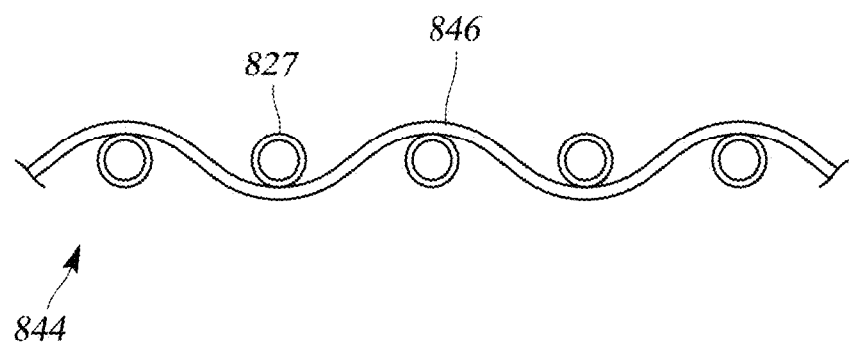
FIG. 10 is an end view of a portion of a bundle of the microporous fibers used in a gas infusion module.

In FIG. 10, similar parts to those shown in FIGS. 8 and 9 are designated by the same reference numerals and the previous description is relied upon to describe them.

FIG. 10 shows a portion 844 of the hollow, microporous fibers 827 (FIG. 9) before they are coiled into the bundle of microporous fibers 827. The microporous fibers 827 form the warp of a woven, open mesh structure, with solid fibers 846, of a similar liquid repellent substance to the microporous fibers, forming the weft.

In operation utilizing the example embodiment of FIGS. 8-10, oxygen gas was mixed with liquid water, the open-topped tank 824 (FIG. 8) had a capacity of 240 L, and was ~90 cm×45 cm×60 cm high.

The hollow, microporous fibers 827 (FIGS. 9 and 10) each had an outside diameter of about 0.54 mm and were made from polyethylene or polypropylene, both of which are water repellent. The size range of the micropores was controlled in the microporous fiber manufacturing process to produce predetermined, effective pathway diameters, through the walls of the hollow, microporous fibers. The gas into liquid breakthrough pressure of the microporous membranes was of the order of 40 psi (2.8 kg per cm2). The specific surface area of the bundle of hollow, microporous fibers was about 3,000 square meters per cubic meter of volume.

More specifically, the following Table I gives details of two different, polyethylene fibers used in the tests.

TABLE 1

| Fiber | $\varepsilon p$ | Do | Di |
|---|---|---|---|
| I | >.07 | ~540 | ~350 |
| II | >0.7 | ~380 | ~280 |

$\varepsilon p$ is the average porosity of the fibers,
Do is the outside diameter of the fibers in microns, and
Di is the inside diameter of the fibers in microns.

The following Table II gives details of bundled fibers used in modules forming the apparatus shown in FIG. 2 for different tests.

TABLE II

| Module | L | No. | Dc | Dg | Fiber |
|---|---|---|---|---|---|
| I | 31 | 6400 | 2.667 | 7.79 | I |
| II | 31 | 12800 | 2.668 | 7.79 | II |
| III | 66 | 6400 | 2.667 | 7.79 | I |

L is the length of the fibers in cms,
No is the number of fibers in the bundle
Dc is the inside diameter of the bundle, and
Dg is the outside diameter of the bundle.

Figure 11:
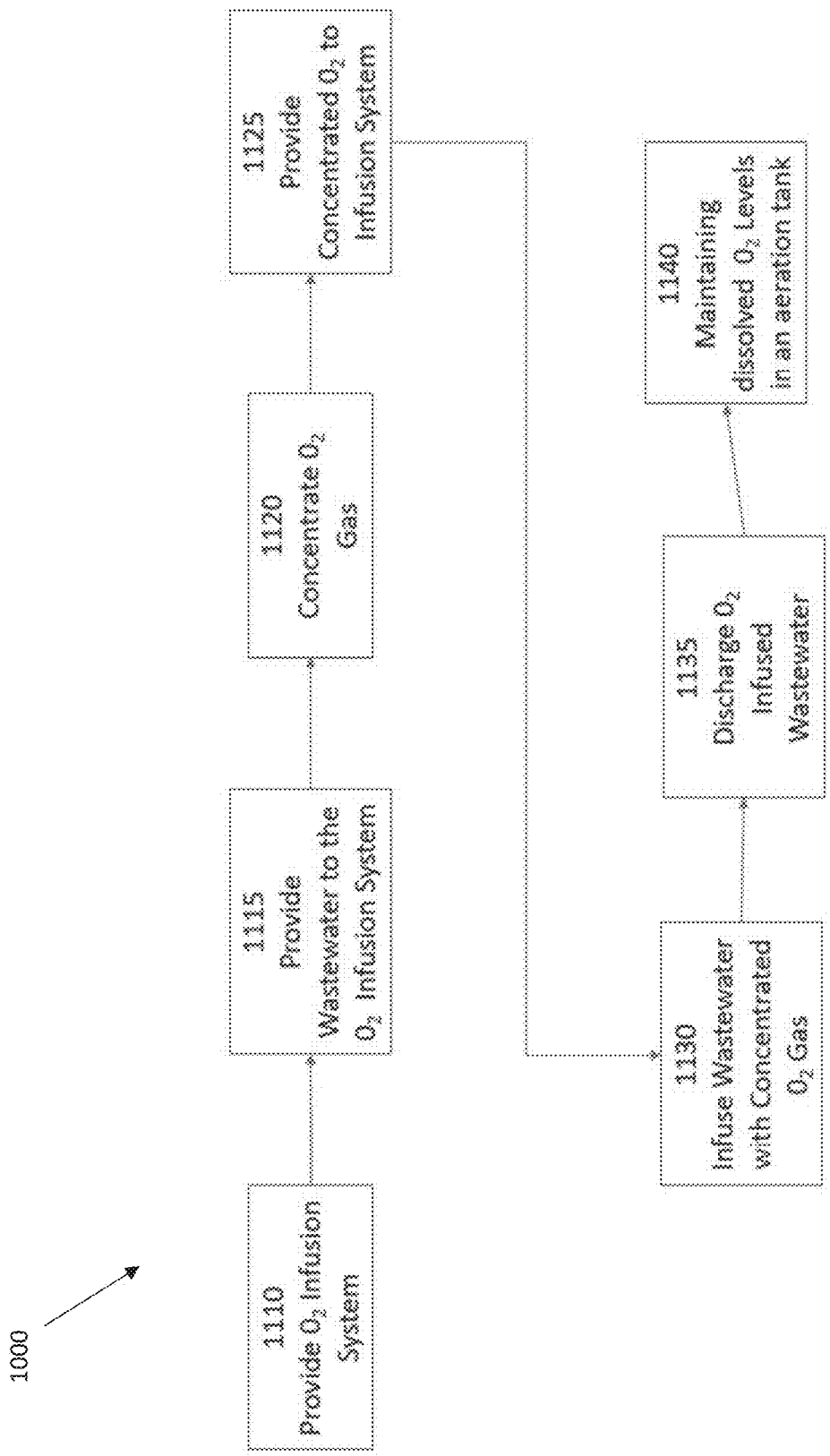
FIG. 11 illustrates a process for treating wastewater.

FIG. 11 illustrates an example embodiment of a process 1000 for utilizing oxygen infusion in wastewater treatment including the steps of:

(1) providing 1110 an oxygen infusion system comprising: an oxygen generator and one or more gas infusion modules having a plurality of microporous membranes;

(2) receiving wastewater influent and providing 1115 the wastewater influent to the one or more gas infusion modules as a specified flow rate;

(3) concentrating 1120 oxygen from atmospheric air to levels above ambient conditions;

(4) providing 1125 the concentrated oxygen to the one or more gas infusion modules at a pressure to facilitate oxygen transfer to the wastewater influent;

(5) infusing 1130 the wastewater influent with the concentrated oxygen through the microporous membrane in a bubble-free gas transfer manner that inhibits the formation of oxygen bubbles in the wastewater influent;

(6) discharging 1135 the wastewater influent from the oxygen infusion system to an aeration tank of a wastewater treatment facility, wherein the discharged wastewater has an oxygen saturation of 20 ppm to 30 ppm (inclusive) or higher (e.g., equal to or greater than 30 ppm, between 30 ppm and 60 ppm (inclusive), between 50 ppm and 100 ppm (inclusive), between 75 ppm and 150 ppm (inclusive), and equal to or greater than 150 ppm); and (7) maintaining 1140 the wastewater in the aeration tank at dissolved oxygen levels of 1.5 ppm to 3 ppm, wherein the process of maintaining desired oxygen levels may be done by a constant feed of oxygenated wastewater or recirculation of oxygenated wastewater through a second stage gas infusion unit.

EXAMPLES

Embodiments of the present invention were tested at various flow rates and pressure conditions to achieve the following results listed in Table III:

TABLE III

| PE Flow (lpm) | Oxygenated Flow (lpm) | PE BOD (mg/L) | PE Demand (mg/L) | O2 Supplied (mg/min) | Measured BOD outlet (mg/L) | Remaining O2 (mg/min) | Actual O2 utilized (mg/min) | Actual BOD reduction (mg/min) | O2 Consumption kgO2/kg BOD |
|---|---|---|---|---|---|---|---|---|---|
| 21 | 7 | 92.2 | 1936 | 931 | 41 | 700 | 231 | 788 | 0.293 |
| 12 | 4 | 125 | 1500 | 596 | 56 | 400 | 196 | 604 | 0.324 |
| 16 | 5 | 110 | 1760 | 605 | 55 | 420 | 185 | 605 | 0.306 |
| 14 | 7 | 88 | 1188 | 696 | 32 | 525 | 171 | 516 | 0.331 |

"Industry numbers" for $O_2$ consumption requirement using conventional aeration techniques are typically about 1.5 kg O2 per kg BOD consumed. This is far greater than the numbers observed in the tests in Table III (~0.30) with oxygen infused water. Later tests looked at the reduction of nitrogen (compounds). Based on the ammonia reduction observed in those later tests and the known $O_2$ requirement (4.57 kgO2 per kg N), it is estimated that approximately 100 mg/min of dissolved oxygen was utilized in each of the above runs shown in Table III. This further reduces the $O_2$ consumption to about 0.15 kg per kg BOD, and makes an even stronger case for using an infused oxygen process.

Efficiencies Over Traditional Air Blower Systems:

It has been found that significant efficiencies can obtained using the bubble free oxygen infusion system and process of the present invention to replace traditional aeration systems using air blower devices. For example, a conventional wastewater treatment system using blown air may achieve 1.0 Kg O2/Kg BOD, maintaining 0.5 ppm to 2.0 ppm residual dissolved Oxygen in the aeration tank, while consuming between 12 to 13 Kilowatts of power per day. A similar system that replaces the air blowers in the aeration tank with the oxygen infusion system according to some embodiments described herein may achieve approximately 0.3 Kg $O_2$/Kg BOD, maintaining 10 ppm to 20 ppm residual dissolved oxygen in the aeration tank, while consuming between 3 to 4 Kilowatts per day of power. This represents a tenfold increase in dissolved oxygen while decreasing power consumption by as much as 60% or more.

In one implementation, a test wastewater treatment system having a 300 L/min capacity using the oxygen infusion system for the aeration of the sewage provided the desired biological efficiency factor of approximately 0.3 Kg $O_2$/Kg BOD, with following parameters: the BOD of the influent before oxygenation may be approximately 475 ppm; the BOD of effluent from the aeration tank may be approximately 20 ppm; using a total of 9 gas infusion modules with an influent flow rate to each unit of 150 L/min and an oxygen flow rate to each unit of 4 L/min at a pressure of 20 psi resulted in approximately 91% dissolution of the provided Oxygen, total power usage of approximately 7.75 KW, having a total oxygen supply rate of approximately 36 L/min, treating approximately 18 m$^3$/hr, which further resulted in a power consumption rate of 0.43 KWH/m$^3$ sewage treated. The oxygen may be supplied for example, using an Airsep Oxygen Concentrator (Model AS-D100) having a capacity of approximately 40 L/min.

In another implementation, a test wastewater treatment system having a 500 L/min capacity using the oxygen infusion system for the aeration of the sewage provided the desired biological efficiency factor of approximately 0.3 Kg $O_2$/Kg BOD, with following parameters: the BOD of the influent before oxygenation may be approximately 475 ppm; the BOD of effluent from the aeration tank may be approximately 20 ppm; using a total of 15 gas infusion modules with an influent flow rate to each unit of 150 L/min and an oxygen flow rate to each unit of 4 L/min at a pressure of 20 psi resulted in a total power usage of approximately 13 KW, having a total oxygen supply rate of approximately 60 L/min, treating approximately 30 m$^3$/hr, which further resulted in a power consumption rate of 0.43 KWH/m$^3$ sewage treated. The oxygen may be supplied, for example, using an Airsep Oxygen Concentrator (Model AS-E160) having a capacity of approximately 40 L/min.

Figure 12:
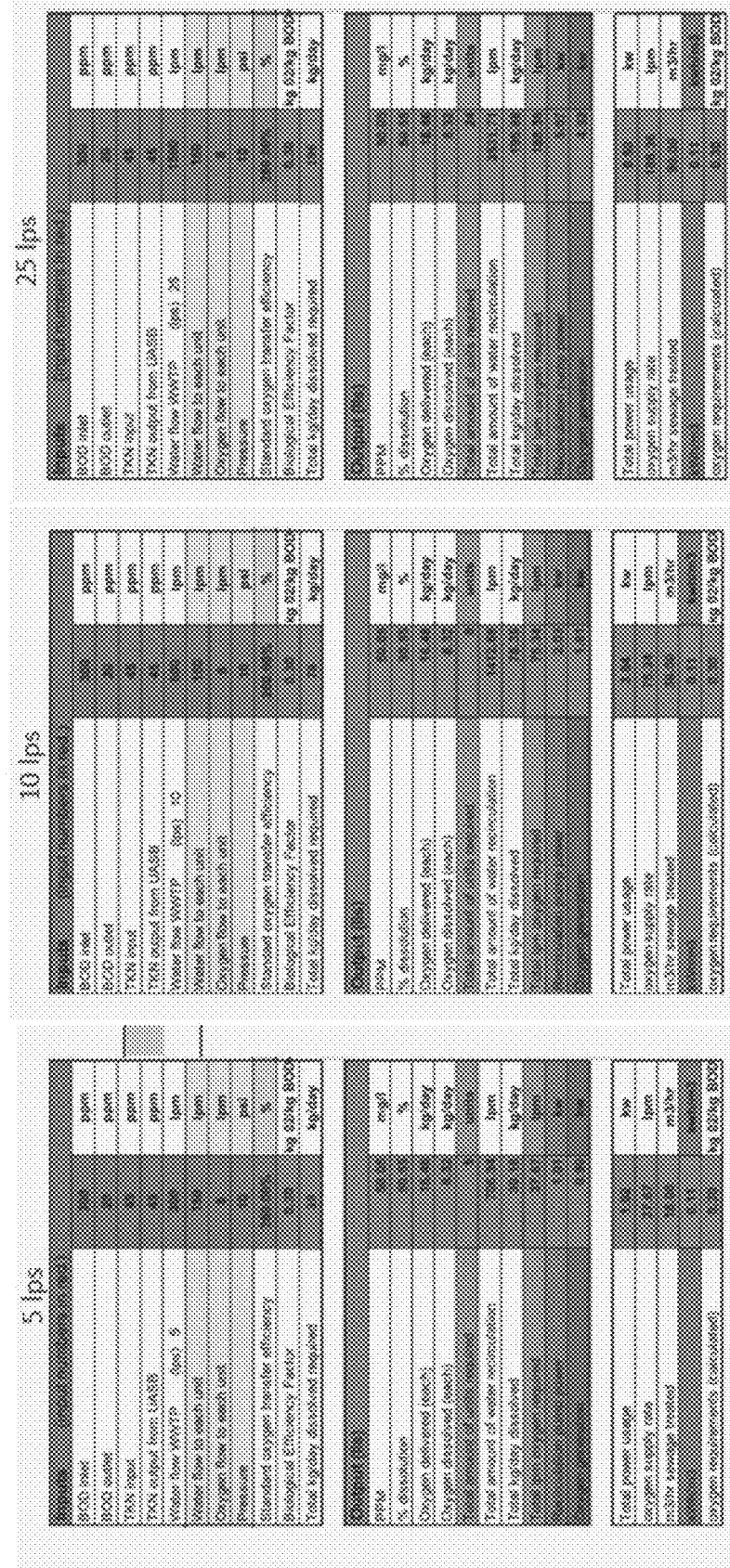
FIG. 12 is a performance table and chart illustrating the improved efficiency and energy consumption under varying capacities and operating conditions of example implementations of a wastewater treatment system utilizing infusion of oxygen in a bubbleless process.
Figure 12:
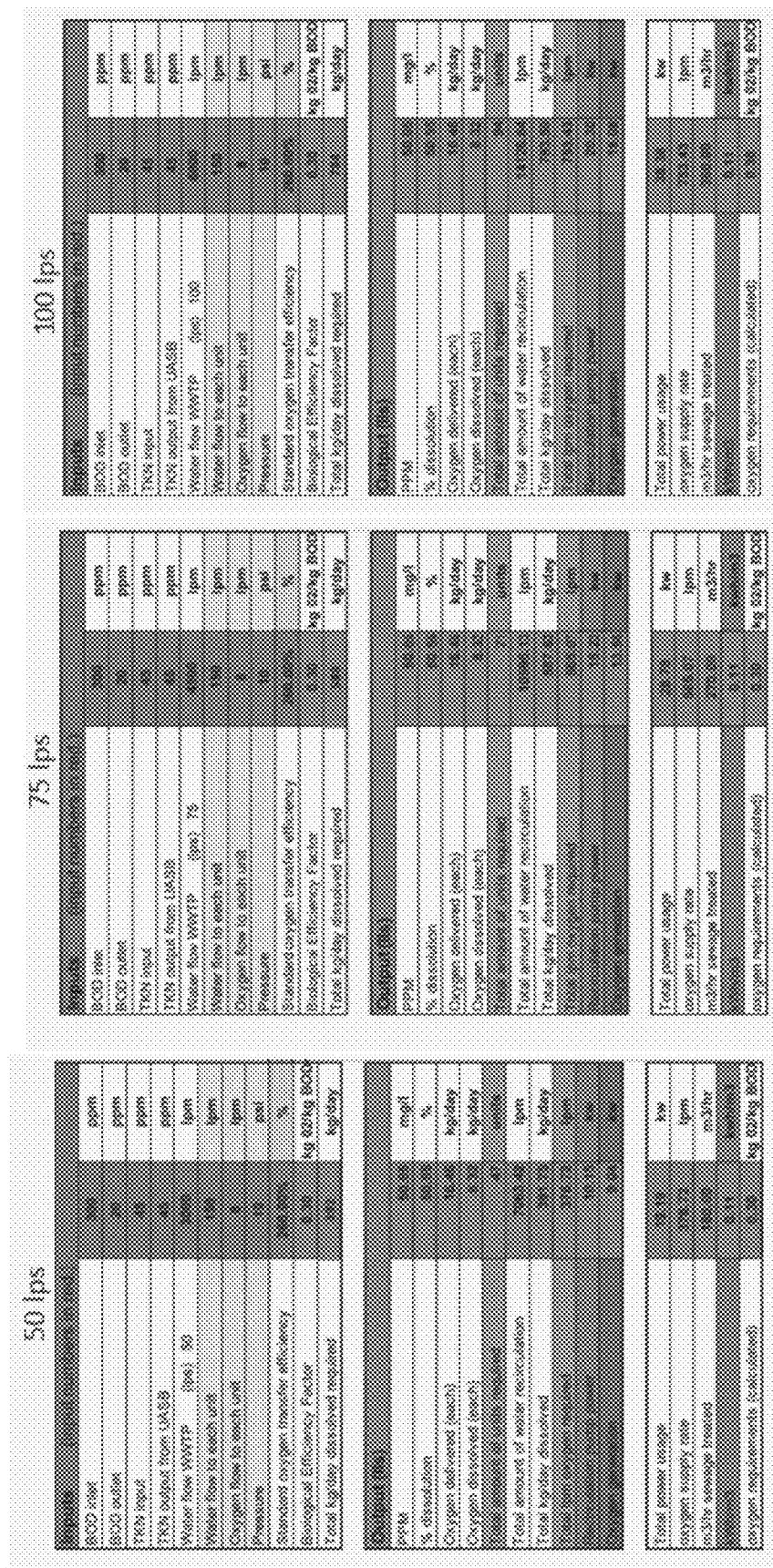

FIG. 12 includes a table showing the performance parameters and efficiency measures for various sized systems that incorporate example embodiments of gas infusion system described herein. It will be appreciated that available oxygen during aeration of the wastewater is increased and power consumption is decreased over traditional aeration systems.

In further example embodiments, various arrangements of the gas infusion modules within the gas infusion unit may be modified in order to maximize flow across the microporous membranes while minimizing the power required to pump the wastewater effluent through the gas infusion unit. Gas infusion modules may be arranged in series, parallel, a combination of in series and in parallel, or bundled in specific groupings with common housings to provide optimized efficiency.

FIG. 13 illustrates an example of a multi-unit array 1310 of gas infusion modules arranged in parallel. As depicted, the multi-unit array 1310 includes multiple gas infusion modules 1315, each comprising a housing, connections for the inflow and outflow of wastewater and concentrated oxygen, and an arrangement of microporous, hollow core fibers, as described in FIGS. 4 through 7, and elsewhere in this disclosure. Array 1310 further comprises a wastewater inlet 1320 for providing wastewater to the array. Inlet 1320 is in communication with supply pipe 1332 which feeds wastewater to each infusion module 1315. Supply pipe 1332 may be in direct connection between any two or more infusion module 1315, connecting each infusion module 1315 in series. Alternatively, supply pipe 1332 may be replaced with a manifold connecting each infusion module 1315 in series. Array 1310 further comprises discharge pipe 1324 for carrying the oxygen infused wastewater from the infusion modules 1315 and away from array 1310 via wastewater outlet 1326. Discharge pipe 1324 may be in direct connection between any two or more infusion module 1315, connecting each infusion module 1315 in series. Alternatively, discharge pipe 1324 may be replaced with a manifold connecting each infusion module 1315 in series. Not shown in FIG. 13 is the oxygen connection or gas discharge as described previously in this disclosure. The example embodiment of array 1310 included fifteen infusion modules in parallel. It will be appreciated than any number of modules 1315 in a single array 1310 arranged in parallel are contemplated herein, from to two modules to fifty or more. The number of modules depends on the required oxygen infusion levels and pumping capability of the targeted wastewater treatment facility.

FIG. 14 illustrates an example of a multi-unit array 1410 of gas infusion modules comprising a first array 1440 with individual modules arranged in parallel as described with respect to the array in FIG. 13 and a second array 1445 also with individual modules arranged in parallel as described with respect to the array in FIG. 13. First array 1440 and second array 1445 are together arranged in series with the outlet 1426 of first array 1440 leading to the inlet 1421 of second array 1445. The multi-unit array 1410 of gas infusion modules depicts a two stage infusion process where wastewater is infused with oxygen in a first stage thorough first array 1440 and then infused again with additional oxygen in a second stage 1445, such that before wastewater is discharged from the multi-unit array 1410 it has flowed through two sets of infusion modules 1415a and 1415b. The illustrated implementation provides for multiple infusion module units arranged in parallel to provide for volume of processing with a second array in series with the first, wherein the second array also has multiple infusion modules arranged in parallel to provide for volume of processing. As depicted, the multi-unit array 1410 includes multiple gas infusion modules 1415a and 1415b, each comprising a housing, connections for the inflow and outflow of wastewater and concentrated oxygen, and an arrangement of microporous, hollow core fibers, as described in FIGS. 4 through 7, and elsewhere in this disclosure. First array 1440 further comprises a wastewater inlet 1420 for providing wastewater to the array. Inlet 1420 is in communication with supply pipe 1422 which feeds wastewater to each infusion module 1415a. First array 1440 further comprises discharge pipe 1424 for carrying the oxygen infused wastewater from the infusion modules 1415a and away from first array 1440 via wastewater outlet 1426. First array 1440 provides a first stage for gas infusion. Oxygenated wastewater from outlet 1426 flows through transfer pipe 1427 and into inlet 1421 of second array 1445.

Second array 1445 further comprises a wastewater inlet 1421 for providing wastewater to the second array. Inlet 1421 is in communication with supply pipe 1423 which feeds wastewater to each second stage infusion module 1415b. Second array 1445 further comprises discharge pipe 1425 for carrying the oxygen infused wastewater from the infusion modules 1415b and away from multi-unit array 1410 via wastewater outlet 1427. Second array 1445 provides a second stage for gas infusion. Oxygenated wastewater from outlet 1427 flows out of the multi-unit array 1410 and typically into an aeration holding pond, tank or pool.

The example embodiment of array 1410 includes twelve infusion modules with the first six infusion modules arranged in parallel and the second six also arranged in parallel, wherein the first six modules are in series with the second six modules such that wastewater flows through at least one module in the first grouping of modules and at least one module in the second grouping of modules. It will be appreciated than any number of modules 1415 in a single array 1440 or 1445 are contemplated herein, from one or two modules to fifty or more. It will further be appreciated that more than two arrays may be arranged in series, such as 3, 4, 5 or more arrays, each containing any number of modules arranged in parallel. The number of modules depends on the required oxygen infusion levels and pumping capability of the targeted wastewater treatment facility to reach a the desired objective of wastewater supersaturated with oxygen while minimizing the electrical demand for pumping the water and aerating the effluent.

Not shown in FIG. 14 is the oxygen connection or gas discharge as described previously in this disclosure.

Figure 15:
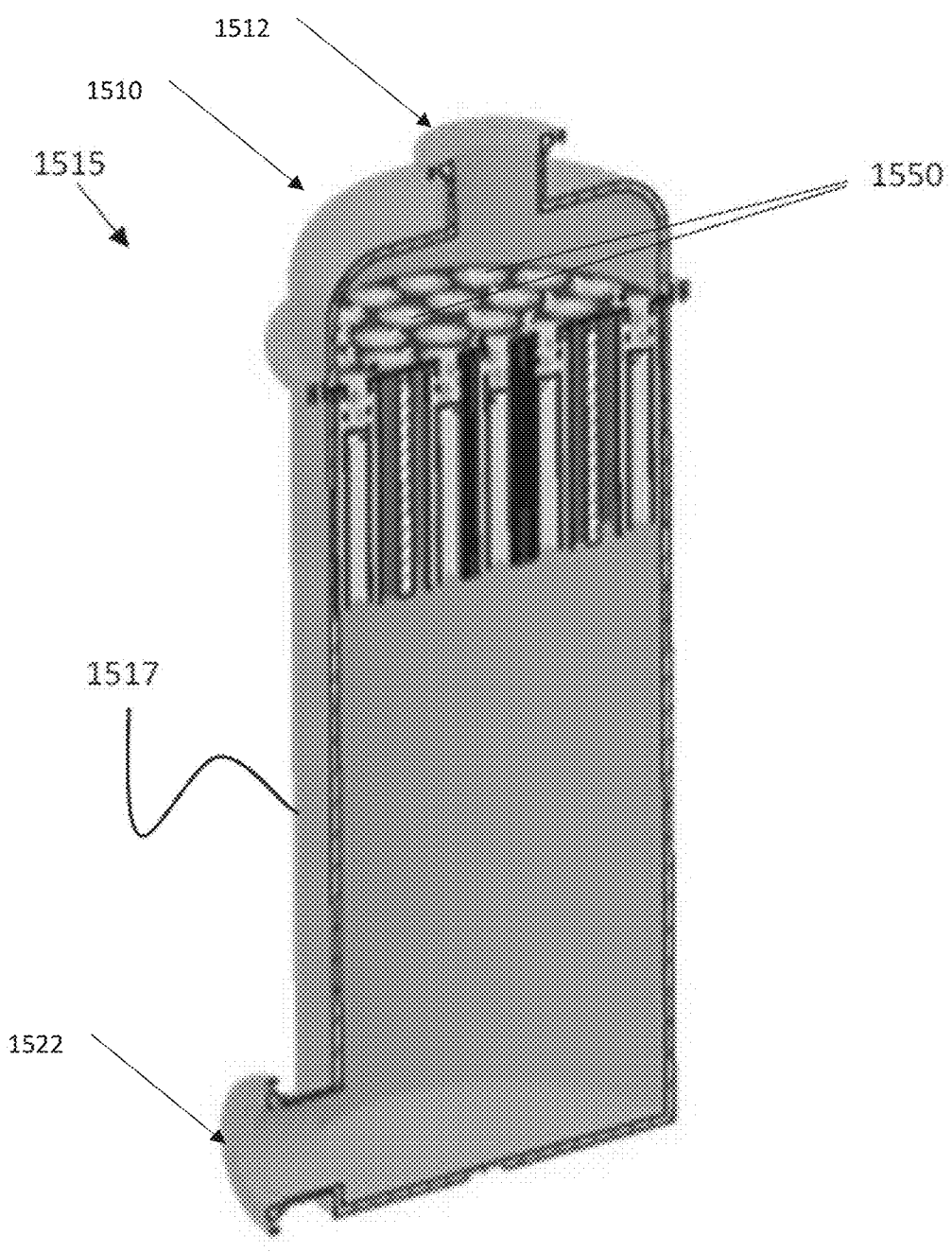
FIG. 15 is an isometric cross-sectional view of a gas infusion high flow module tank containing multiple internal individual gas infusion modules bundled together.

FIG. 15 shows a gas infusion tank 1515 (e.g., high flow module tank) with a cover 1510 and a housing 1517 (a tank vessel) that may contain multiple gas infusion modules 1550, each having an arrangement of the microporous, hollow core fiber bundles as described in FIGS. 4 through 7, and elsewhere in this disclosure (e.g., the gas infusion module 1700 described below). Each gas infusion module 1550 may contain between one and forty or more fiber bundles, such that wastewater is provided to the gas infusion tank 1515 to envelop the multiple gas infusion modules 1150 within the housing 1517, advantageously reducing the number of connections and piping losses (e.g., as compared to the gas infusion module 400 in FIGS. 4-7, due to the absence of components such as the elbows 413 and 458, inlet plug 402, outlet plug 404, etc.). Though not shown in FIG. 15, oxygen can be provided through the fiber bundles, in a co-current manner with the wastewater introduced into the infusion tank 1515, so that oxygen is transferred via the fiber bundles in manner fee of bubbles to the wastewater to supersaturate the wastewater with oxygen. Wastewater can enter the infusion tank 1515 via the opening 1512 (inlet opening) at the top of the infusion tank 1515 and can exit the infusion tank 1515 via the opening 1522 (outlet opening) at the bottom of the tank 1515. In one implementation, wastewater can flow from the opening 1522 to an opening 1512 of another gas infusion tank 1515, thereby providing for a gas infusion system where gas infusion tanks 1515 are arranged in series and wastewater flows through the gas infusion tanks 1515 in series, and flows through each of the gas infusion modules 1550 in each gas infusion tank 1515 in parallel.

Figure 16:
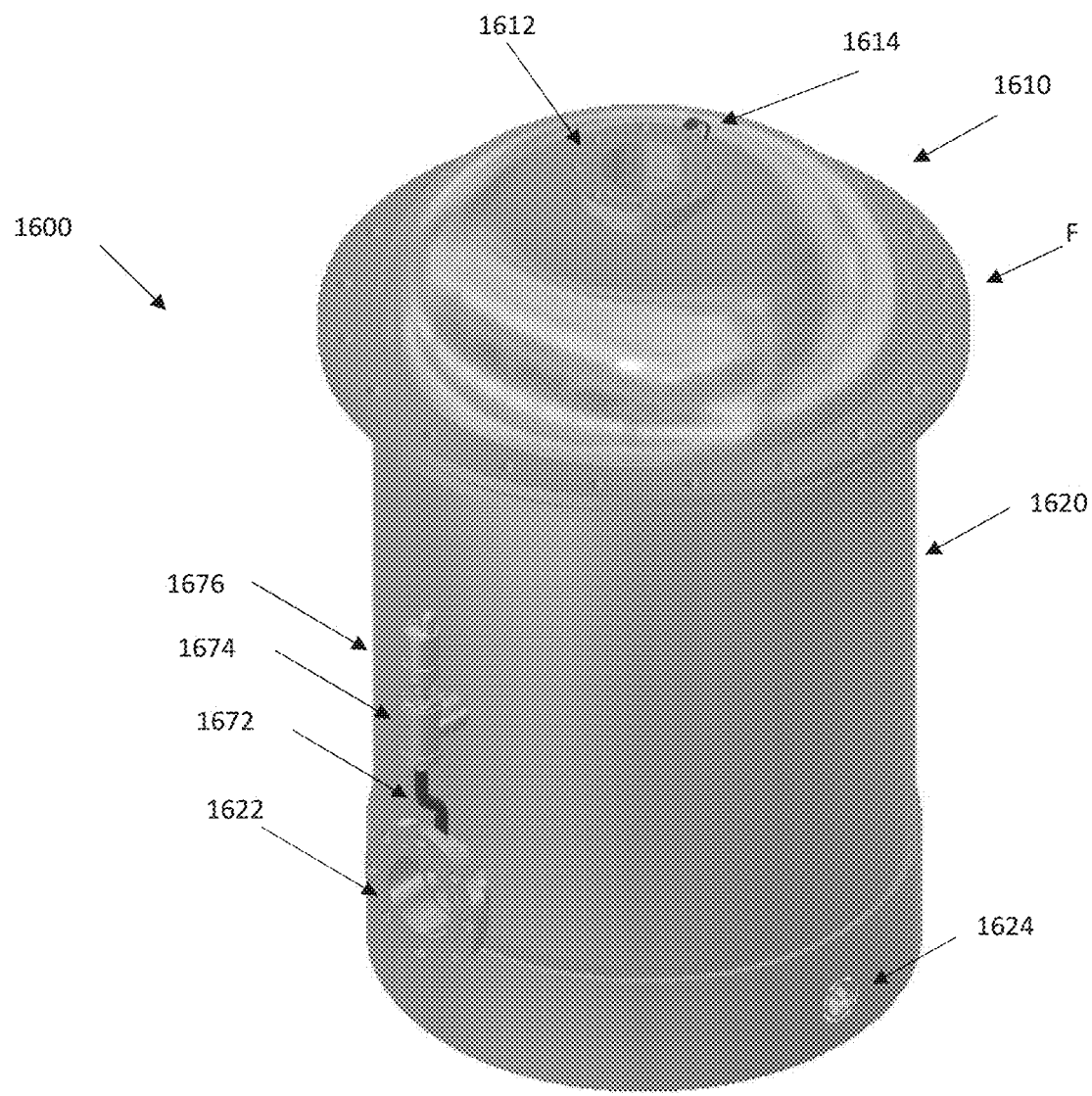
FIG. 16 is an isometric view of a gas infusion high flow module tank for use in a gas infusion system.
Figure 17:
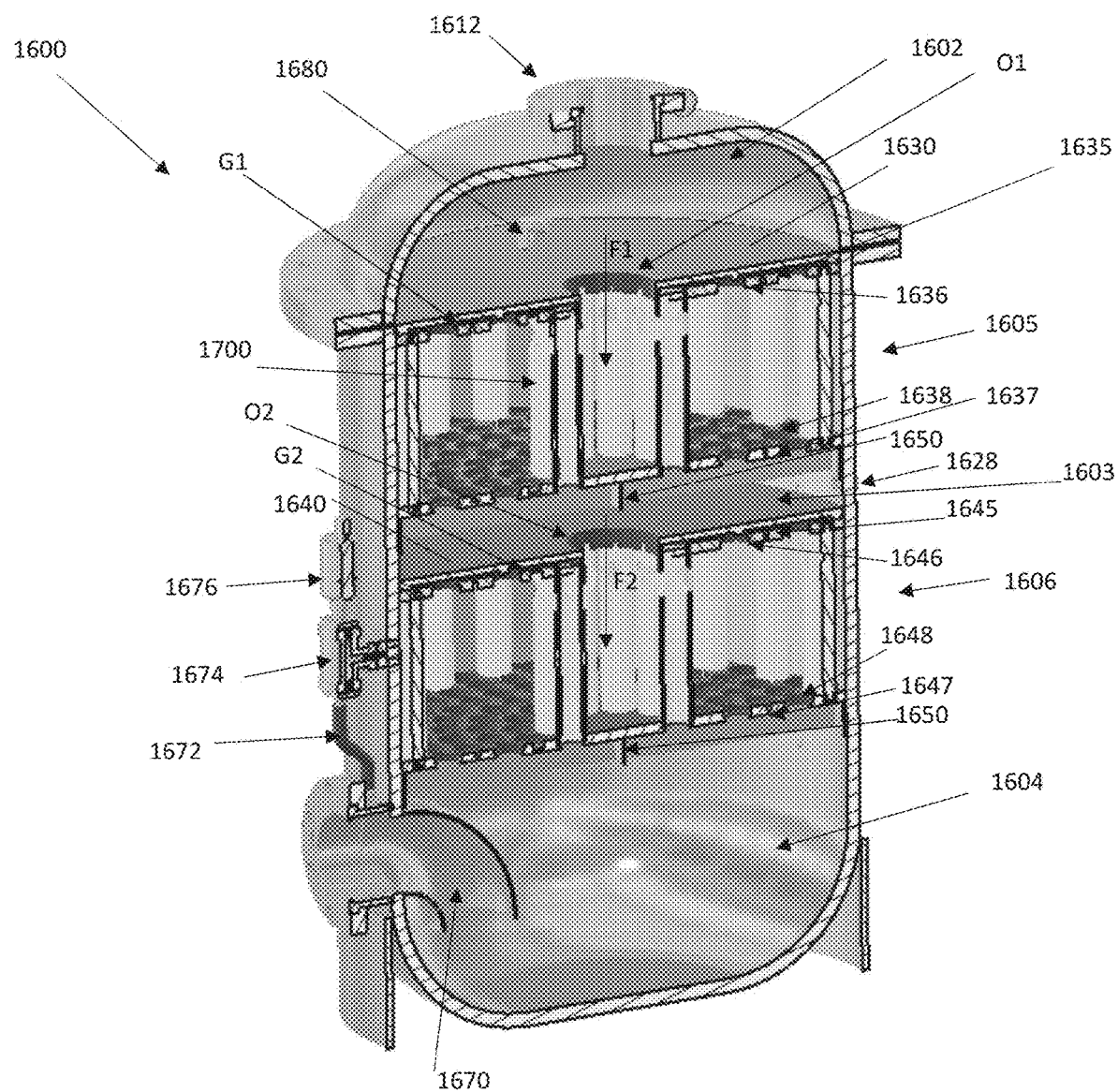
FIG. 17 is an isometric cross-sectional view of the gas infusion high flow module tank of FIG. 16 with multiple gas infusion modules.

FIGS. 16-17 show a gas infusion tank 1600 (e.g., an inline saturator or ILS, a high flow module tank) with a plurality of gas infusion modules 1700 arranged in parallel. For clarity and to show certain structure of the gas infusion tank 1600, some of the gas infusion modules 1700 are not shown in the as infusion tank 1600 of FIG. 17. The gas infusion tank 1600 (e.g., multiple gas infusion tanks 1600, for example connected in parallel) can be incorporated into a gas infusion unit (e.g., such as a standalone gas infusion unit similar to the gas infusion unit 200 described above in connection with FIG. 2). For example the gas infusion tank 1600 (e.g., multiple gas infusion tanks 1600 connected in parallel) can replace the gas infusion system 220 in FIG. 2. Accordingly, the components and description above for the gas infusion unit 200 is understood to apply to a system incorporating the gas infusion tank 1600 (e.g., multiple gas infusion tanks 1600 connected in parallel) in a standalone unit.

Figure 18:
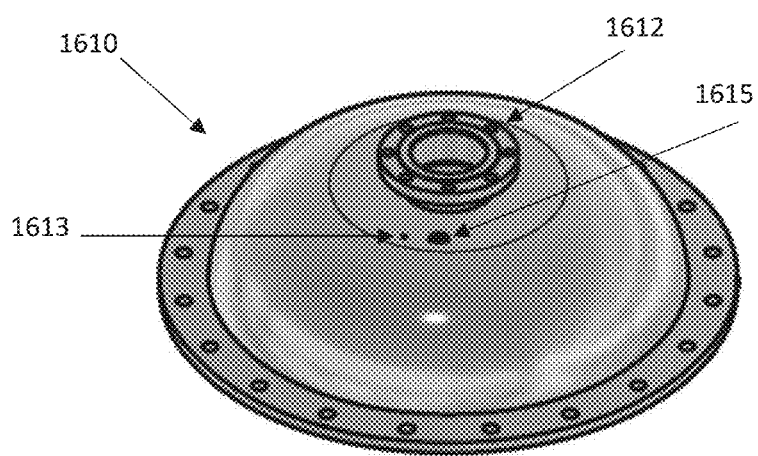
FIG. 18 is a perspective view of a cover of the gas infusion high flow module tank of FIGS. 16-17.

The gas infusion tank 1600 has a cover 1610 and a tank vessel 1620 to which the cover 1610 can be coupled (e.g., via flanges F on both the cover 1610 and the tank vessel 1620). The cover 1610 has an opening 1612 via which wastewater can enter the gas infusion tank 1600, a pressure gauge 1614 attached to a port 1613 (see FIG. 18) and a coupling 1615 (see FIG. 18) via which oxygen (e.g., from an oxygen generator or oxygen tank) can be introduced into the gas infusion tank 1600. In one implementation, the port 1613 can be a ¼ inch gauge port. In one implementation, the coupling 1615 can be a ¾ inch coupling (e.g., stainless steel coupling). In one implementation, the tank vessel 1620 can have a height to approximately 52 inches.

With reference to FIG. 17, the gas infusion tank 1600 has (in order) an upper plenum chamber 1602, a first array 1605 of gas infusion modules 1700, an intermediate chamber 1603, a second array 1606 of gas infusion modules 1700 and a lower plenum chamber 1604. As discussed above, wastewater enters the gas infusion tank 1600 via the opening 1612, and wastewater exits the gas infusion tank 1600 via siphon break or tube 1670 and opening 1622. In one implementation, the opening 1622 can be approximately 38 inches from the flange F of the tank vessel 1620. The tank vessel 1620 has a drain 1624 via which the tank vessel 1620 can be drained of liquid. The drain 1624 can be located a distance H1 from the flange F of the tank vessel 1620, as shown in FIG. 20B. In one implementation, the distance H1 can be about 48 inches. In one implementation, the tank vessel 1620 has an inner diameter of 36 inches (e.g., about 1 m), but can have a different diameter in other implementations. In one implementation, the first array 1605 and the second array 1606 can each have 150 gas infusion modules 1700. However, in other implementations, the first array 1605 and the second array 1606 can have a different number of gas infusion modules 1700 (e.g., greater than 150 modules or smaller than 150 modules). In another implementation, the gas infusion tank 1600 only has the first array 1605 of gas infusion modules 1700 and excludes the second array 1606 of gas infusion modules 1700.

Figure 19:
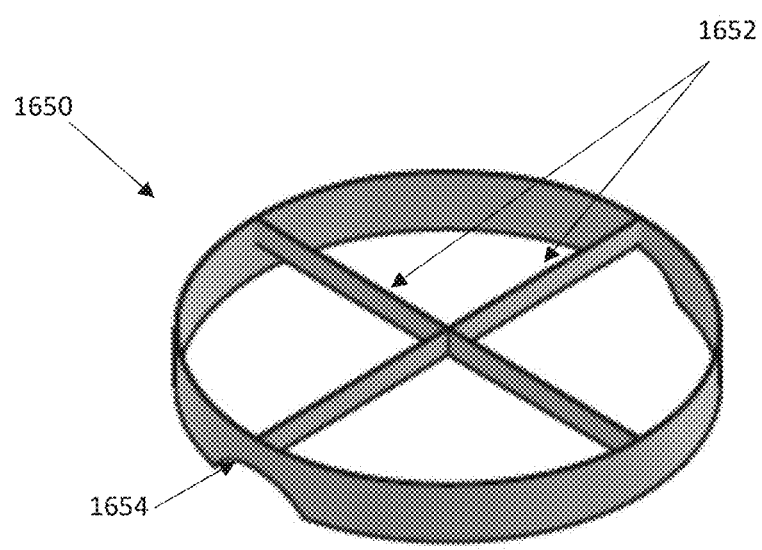
FIG. 19 is a perspective view of a brace used in the gas infusion high flow module tank of FIGS. 16-17.

With reference to the first array 1605 of gas infusion modules 1700, the gas infusion modules 1700 are disposed between a first plate 1635 and a second plate 1637, the first plate 1635 having openings 1636 and the second plate 1637 having openings 1638 that align with each other. Each of the gas infusion modules 1700 is disposed between and aligned with one of the openings 1636 in the first plate 1635 and one of the openings 1638 in the second plate 1637. A plate 1630 is spaced above the first plate 1635 (e.g., by spacers between the plate 1630 and the first plate 1635, such as protrusions on an underside of the plate 1630) to define a gap G1 between the plate 1630 and the first plate 1635. A cross brace 1650 (see FIG. 19) is located under the second plate 1637 and supports the first array 1605 of gas infusion modules 1700. The cross brace 1650 has a pair of arms 1652 that cross each other and a recess 1654 (e.g., pair of recesses 1654) on a bottom edge of the cross brace 1650

With reference to the second array 1606 of gas infusion modules 1700, the gas infusion modules 1700 are disposed between a third plate 1645 and a fourth plate 1647, the third plate 1645 having openings 1646 and the fourth plate 1647 having openings 1648 that align with each other. Each of the gas infusion modules 1700 is disposed between and aligned with one of the openings 1646 in the third plate 1645 and one of the openings 1648 in the fourth plate 1647. A plate 1640 is spaced above the third plate 1645 (e.g., by spacers between the plate 1640 and the third plate 1645, such as protrusions on an underside of the plate 1640) to define a gap G2 between the plate 1640 and the third plate 1645. A cross brace 1650 (see FIG. 19) is located under the fourth plate 1647 and supports the second array 1606 of gas infusion modules 1700. The recess 1654 has a contour that generally matches the contour of the tube 1670 over which the cross brace 1650 is positioned.

With continued reference to FIG. 17, the plate 1640 is spaced from the second plate 1637 to define the intermediate chamber 1603 therebetween. The intermediate chamber 1603 is sized to inhibit (e.g., prevent) turbulence of flow to minimize (e.g., avoid) oxygen coming out of solution in the infused wastewater. The plate 1630 has a central opening O1, and the plate 1640 has a central opening O2. A fitting 1680 is coupled to the plate 1630 to provide fluid communication with the gap G1. A tube, hose or pipe (not shown) can couple to the fitting 1680 and an underside of the coupling 1615 to provide a flow path via which oxygen (e.g., from an oxygen generator or oxygen tank) can be introduced into the gap G1 and thereby the gas infusion modules 1700 of the first array 1605. Advantageously, the gap G1 allows the equalization of pressure for the oxygen injected into the gap G1 so that the gas infusion modules 1700 of the first array 1605 are provided with oxygen at the same pressure and flowrate. Additionally, delivery of oxygen via the gap G1 (e.g., as compared with the structure, for example elbow 413 and plug in the gas infusion module 400 of FIGS. 4-7) simplifies the delivery of oxygen to the plurality of gas infusion modules 1700 and reduces the number of connections and losses (e.g., due to piping that is excluded by using the gap G1 to distribute oxygen delivery to the gas infusion modules 1700).

Though not shown, a fitting (similar to the fitting 1680) is coupled to the plate 1640 to provide fluid communication with the gap G2. A tube, hose or pipe (not shown) can couple to the fitting and a coupling 1628 in a sidewall of the tank vessel 1620 (see FIGS. 20A-20B) to provide a flow path via which oxygen (e.g., from an oxygen generator or oxygen tank) can be introduced into the gap G2 and thereby the gas infusion modules 1700 of the second array 1606. Advantageously, the gap G2 allows the equalization of pressure for the oxygen injected into the gap G2 so that the gas infusion modules 1700 of the second array 1606 are provided with oxygen at the same pressure and flowrate. Additionally, delivery of oxygen via the gap G2 (e.g., as compared with the structure, for example elbow 413 and plug in the gas infusion module 400 of FIGS. 4-7) simplifies the delivery of oxygen to the plurality of gas infusion modules 1700 and reduces the number of connections and losses (e.g., due to piping that is excluded by using the gap G1 to distribute oxygen delivery to the gas infusion modules 1700).

Oxygen can be provided to the coupling 1615 and the coupling 1628 by the same source (e.g., oxygen generator or oxygen tank). In one implementation, a flowmeter can be in fluid communication with the coupling 1615 and the coupling 1628 to independently regulate the flow of oxygen through the couplings 1615, 1628 (e.g., so that the oxygen injected through the coupling 1628 is at a pressure about 1 psi greater than the oxygen injected through the coupling 1615). The flowmeters can optionally be controlled by a controller (e.g., a microcontroller unit or MCU, a computer processor, etc.), In operation, wastewater enters the upper plenum chamber 1602 of the gas infusion tank 1600 via the opening 1612 and passes through the opening O1 in the plate 1630 and along a flow path F1 into a space above the second plate 1637. The wastewater liquid level rises in said space above the second plate 1637, as the wastewater flows around all of the gas infusion modules 1700 in the first array 1605, until it reaches the openings of the gas infusion modules 1700, as further discussed below, and the wastewater flows into the gas infusion modules 1700. While the wastewater flows through the gas infusion modules 1700 of the first array 1605, the wastewater is infused with oxygen, which is introduced into the top of the gas infusion modules 1700 via the gap G1. The structure of the gas infusion module 1700 is further described below. The wastewater infused with oxygen exits the gas infusion modules 1700 of the first array 1605 via the openings 1638 in the second plate 1637 and into the intermediate chamber 1603.

Once in the intermediate chamber 1603, the wastewater passes through the opening O2 in the plate 1640 and along a flow path F2 into a space above the fourth plate 1647. The wastewater liquid level rises in said space above the fourth plate 1647, as the wastewater flows around all of the gas infusion modules 1700 in the second array 1606, until it reaches the openings of the gas infusion modules 1700, and the wastewater flows into the gas infusion modules 1700. While the wastewater flows through the gas infusion modules 1700 of the second array 1606, the wastewater is infused with oxygen, which is introduced into the top of the gas infusion modules 1700 via the gap G2. The wastewater saturated with oxygen exits the gas infusion modules 1700 of the second array 1606 via the openings 1648 in the fourth plate 1647 and into the lower plenum chamber 1604. The wastewater (saturated with oxygen via the first array 1605 and second array 1606 of gas infusion modules 1700) exits the lower plenum chamber 1604 via the tube 1670 and opening 1622.

Figure 20A:
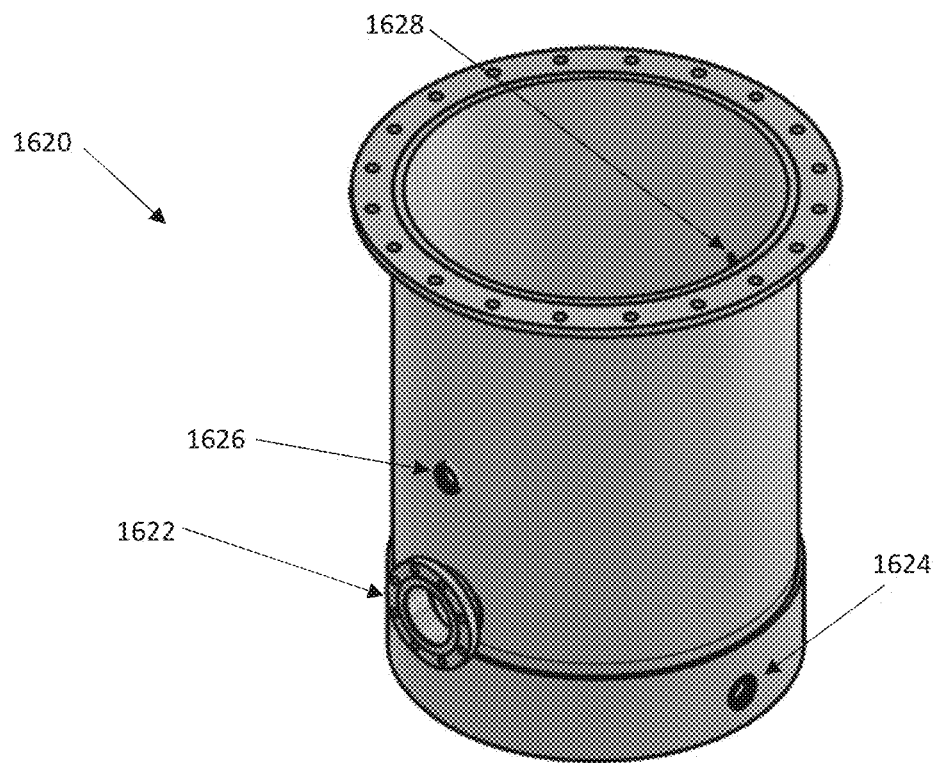
FIG. 20A is a perspective view of a vessel of the gas infusion high flow module tank of FIGS. 16-17.
Figure 20B:
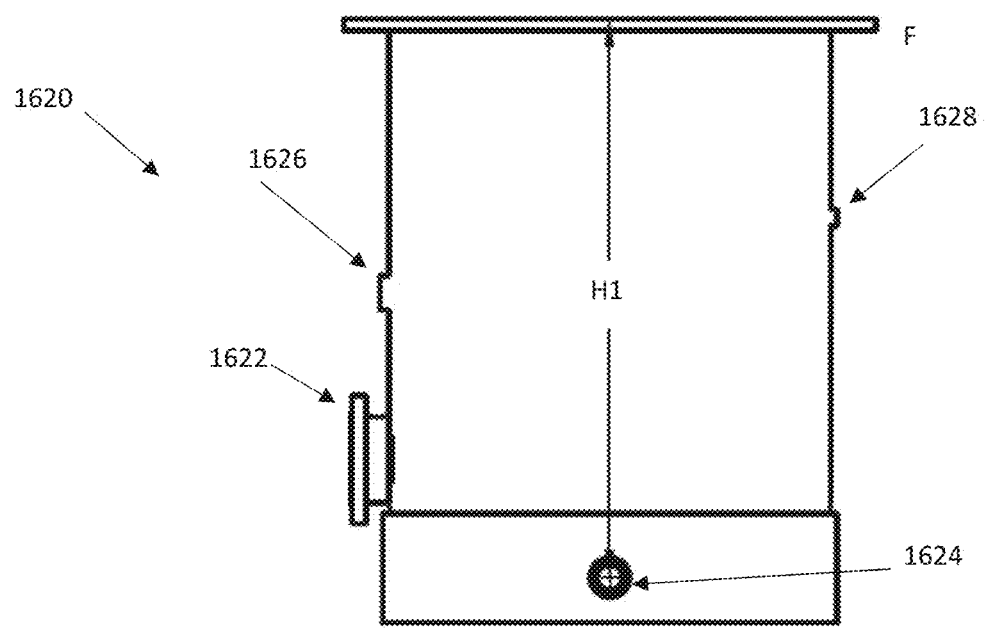
FIG. 20B is a schematic side view of the vessel in FIG. 20A.

With continued reference to FIGS. 16-17 and 20A, undissolved gas from the saturated wastewater (e.g., undissolved oxygen, excess nitrogen removed from the wastewater due to the infusion of oxygen in the wastewater) can pass through a T-coupling 1674 to a vent 1676. Said gas can pass through the hose 1672 as the saturated wastewater exits the opening 1622 and/or can pass through fitting 1626 in the tank vessel 1620 (see FIG. 20A) to which the T-coupling 1674 couples. The fitting 1626 can in one implementation be located on the tank vessel 1620 so it is a vertical location that coincides with a location just below the openings of the gas infusion modules 1700. The location of the fitting 1626 provides the liquid level for the wastewater in the tank vessel 1620. In one implementation, the fitting 1626 can have a diameter of 2 inches and be approximately 23½ inches from the flange F of the tank vessel 1620.

The gas infusion tank 1600 provides for a series parallel arrangement for gas infusion (e.g., oxygen infusion) of wastewater. The wastewater flows in parallel through the gas infusion modules 1700 of each of the first array 1605 and second array 1606. Additionally, the wastewater flows in series from the first array 1605 to the second array 1606. The series parallel arrangement advantageously improves the performance of the gas infusion tank 1600 because additional infusion of the wastewater with oxygen is achieved, as compared with a gas infusion tank that only had one array of gas infusion modules 1700. Additionally, the gas infusion tank 1600, as compared to the gas infusion module 400 in FIGS. 4-7, has a simplified architecture for delivering oxygen to the gas infusion modules 1700 of the first array 1605 and the second array 1606 that avoids having to individually feed oxygen to each of the gas infusion modules 1700 via separate fitting and tubes, thereby reducing time and materials needed to assemble the system, as well as reducing (e.g. eliminating) possible failure points due to the use of multiple fittings and hoses, which are not needed in the gas infusion tank 1600. Further, because the wastewater passes in series through the first array 1605 and the second array 1606 of the gas infusion modules 1700 (e.g., two passes through gas infusion modules), the gas infusion tank 1600 excludes the use of a recirculation pump since it does not need to recirculate wastewater through an array of gas infusion modules to achieve multiple passes through the gas infusion modules (e.g., two passes are already achieved by flowing wastewater through the first array 1605 and the second array 1606).

In one implementation, the gas infusion tank 1600 can be operated at a maximum flowrate of wastewater of approximately 1700 LPM at 20 psi and a maximum flowrate of oxygen of 315 LPM (e.g., to supersaturate the wastewater with oxygen). The oxygen would be delivered at substantially the same pressure (e.g., about 0.5 psi higher than the liquid pressure) to facilitate the transfer of oxygen to the wastewater within the gas infusion modules 1700 (e.g., to inhibit or prevent the wastewater from breaking the surface tension of the pores in the fibers of the gas infusion module 1700 and flood the fibers). In another implementation, the gas infusion tank 1600 can be operated at a maximum flowrate of wastewater of approximately 1700 LPM at 30 psi and a maximum flowrate of oxygen of 400 LPM (e.g., to supersaturate the wastewater with oxygen).

Figure 21:
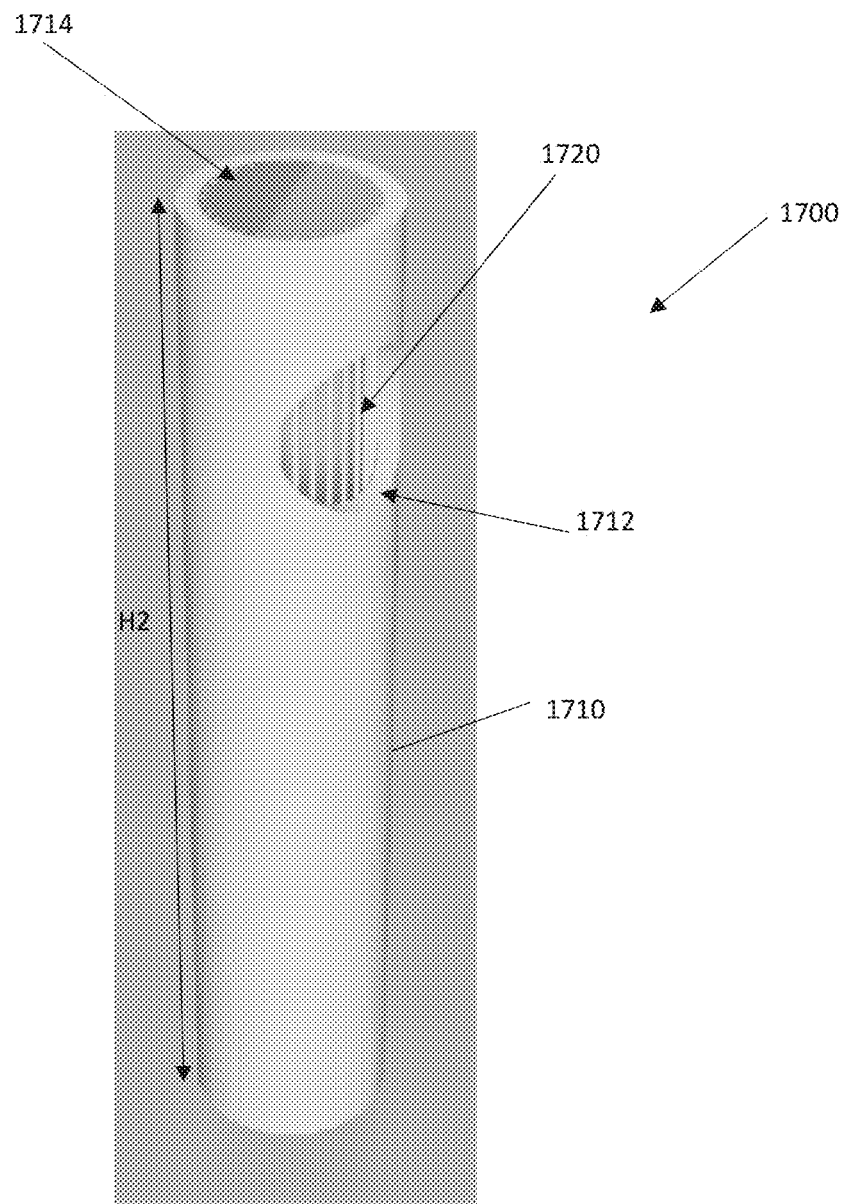
FIG. 21 is a perspective view of a gas infusion module.

FIG. 21 shows a schematic view of one of the gas infusion modules 1700, which has a housing 1710 with one or more openings 1712 (e.g., a pair of openings on opposite sides of the housing 1710). The gas infusion module 1700 has a height H2 and houses multiple fibers 1720. The fibers 1720 can be similar to (e.g., identical to) the fibers 429 of the gas infusion module 400 in FIGS. 4-7. The fibers 1720 can in one implementation be a 540 micron microporous hollow fiber (of polyethylene) with an outer diameter of about 0.5 mm, a wall thickness of 95 microns that defines a central bore (e.g., channel, pathway) of each of the fibers 1720 and about 75% porosity with a nominal pore size of about 0.1 microns. The fibers 1720 can be weaved together with solid hydrophobic fibers or rods, in a similar manner as shown in FIG. 10, to form a warp of a woven, open mesh structure, or a mat (e.g., to facilitate or improve contact between the wastewater and the fibers 1720). The mat can then be rolled and inserted into the housing 1710. In one implementation, eight fibers 1720 are weaved together to make the mat. In one implementation, the mat can have a length of about 30 inches (in the direction of the fibers 1720) and a width of about 24½ inches. In another implementation, the fibers 1720 can be a 270 micron microporous hollow fiber with an outer diameter of about 0.25 mm. In one implementation, the length of the fibers 1720 in the gas infusion modules 1700 is between about 9 inches and about 13 inches, such as about 10 inches. The fibers 1720 can be held in the housing 1710 by a disc (e.g., an epoxy resin disc similar to resin disc 425 in the gas infusion module 400 in FIGS. 4-7).

In one implementation, the housing 1710 has an inner diameter of about 2 inches and the number of fibers 1720 in the housing 1710 is 3200, the fibers 1720 (and the housing 1710) having a length of 10 inches. The fibers 1720 have a packing factor in the housing 1710 of about 38% (e.g. 38% of the space in the housing 1710 is taken up by the fibers 1720). The gas infusion module 1700 can be operated at a wastewater liquid flow of 18 LPM at 20 psi and an oxygen flow of 1.2 LPM at a 92% purity.

The gas infusion tank 1600 (e.g., inline saturator) with the gas infusion modules 1700 as described above can be used in a gas infusion system to infuse wastewater with oxygen in a manner that advantageously improves the efficiency of the wastewater treatment plant by approximately 50%. Below are example calculations for the operation of a gas infusion system utilizing the gas infusion tank 1600 incorporating the gas infusion modules 1700 as described above.

Table IV below shows design parameters for a waste water treatment plant (WWTP).

TABLE IV

| Waste Water Treatment Plant (WWTP) Operating Parameters Inlet WWTP | | | |
|---|---|---|---|
| BOD inlet | 216 | ppm | |
| BOD outlet | 20 | ppm | |
| TKN input | 60 | ppm | |
| TKN output from UASB | 60 | ppm | |
| Water flow WWTP (PER TRAIN) | 60 | lps | 3600 lpm |
| Biological Efficiency Factor | 1.00 | kg 02/kg BOD | |
| Enter % dissolution efficiency expected | 90.00 | % | |
| Oxygen concentrator-PSA or VSA | VSA | 13.29 | kw/h |
| Blower efficiency (Conventional) | 10.40% | % | |
| Feed pump rated efficiency | 90% | % | |

Table V below shows the design parameters for one of the gas infusion modules 1700.

TABLE V

| Design Parameters for 1 Gas Infusion Module Design Parameters (1 module) There are 1600 fibers in a 30" single sheet. | | | |
|---|---|---|---|
| # of full-length folded partial sheets used | 2 | | |
| Total # of fibers | 3200 | | |
| Packing Factor | 38.09 | % | (Max 38%) |
| # of sheets used | 0.71 | sheets | |
| CoreOD | 0.000 | inch | 0 cm |
| Shell ID | 2.00 | inch | 5 cm |
| Fiber length | 10.000 | inch | 25 cm |
| Temp | 20 | ('C) | |
| Inlet water do concentration | 0 | PPm | |

TABLE V-continued

Design Parameters for 1 Gas Infusion Module
Design Parameters (1 module)
There are 1600 fibers in a 30" single sheet.

| | | | |
|---|---|---|---|
| Desired oxygen flow to each | 1.2 | lpm | 1200 sccm |
| Desired water flow each | 18.00 | (LPM) | |
| PO2 | 20.00 | psig | 34.70 psia |
| Oxygen concentration | 92.00 | % | 0.92 |
| Flooded inlet to pump | 4.5 | meters | 6.34 psig |

Table VI below shows the outlet performance for one of the gas infusion modules 1700.

TABLE VI

Outlet Performance for 1 Gas Infusion Module
Outlet Performance (1 module)

| | | | |
|---|---|---|---|
| Outlet ppm | 67.517 | ppm | |
| Sat' P(psi) | 22.855 | psi | 8.2 psig?? |
| % sat'd | 55.690 | % | |
| kg/day O2 | 1.750 | kg/day | |
| O2 dissolved each | 0.9 | lpm | 850.71 sccm |
| Module dissolution efficiency | 78.89 | % | |
| kg O2/d · m2 | 1.277 | | |
| Water velocity | 24.691 | cm/s | |
| "Min. press. req. for dissolution | 20.30 | psi | 14.28 h(m) |
| Water flow to each unit | 18.0 | lpm | |
| Oxygen flow to each unit | 1.2 | lpm | |

Table VII below shows the outlet performance for the wastewater treatment plant (WWTP).

TABLE VII

Outlet Performance for Wastewater Treatment Plant (WWTP)
Output WWTP system (llS)

| | | | |
|---|---|---|---|
| PPM | 60.76 | mg/l | |
| Oxygen delivered (each) | 1.75 | kg/day | |
| Oxygen delivered (each) | 1.58 | kg/day | |
| Total kg/day dissolved require | 1,038 | kg/day | 43 kg/h |
| Total # of fiber insets | 659 | inserts | 470.9 sheets |
| Total amount of water recirculated | 11867.62 | lpm | 712.06 m3/h |
| x times the inlet flowrate | 3.30 | x inlet flow | |
| Total kgO2/day dissolved | 1038.44 | kg/day | 43.27 kg/hr |
| Total lpm oxygen required | 791.17 | lpm | 1139.29 m3/d |
| Recirculation pump power | 20.62 | kw | 28.05 hp |
| Oxygen generation | 13.29 | kw | 18.08 hp |
| Total power usage | 33.91 | kw | |
| Oxygen supply rate | 791.17 | lpm | |
| m3/hr sewage treated | 216.00 | m3/hr | 5184 m3/day |
| kWh/m3 infusion with gas infusion system disclosed herein | 0.16 | kwh/m3 | |
| kWh/m3 Conventional | 0.33 | kwh/m3 | |
| Oxygen requirements (calculated) | 0.93 | kg O2/kg BOD | |
| Oxygen usage efficiency | 1.28 | kgO2/kwh | |

Table VIII below shows the design parameters for the gas infusion system using the gas infusion tank 1600 (inline saturator or ILS) with the gas infusion modules 1700 as described above to meet the output performance for the wastewater treatment plant (WWTP).

TABLE VIII

Inline Saturator Design
ILS multimodule design

| | | |
|---|---|---|
| # of fiber inserts per ils | 150 | |
| Total number of ILS units required | 4.4 | ILS units |
| Amount of water to each ILS | 2700 | lpm |

As shown in Tables IV to VIII, in order to meet the output performance of the wastewater treatment plant (WWTP), the gas infusion system needs at least 4.4 ILS units or gas infusion tanks 1600, or five gas infusion tanks 1600. The five gas infusion tanks 1600 can be part of a standalone gas infusion system or unit, similar to the gas infusion unit 200 in FIG. 2, where the five gas infusion tanks 1600 can be operated in parallel. The calculations show that such a gas infusion system or unit using the gas infusion tanks 1600 and gas infusion modules 1700 described herein would advantageously achieve a reduction in power use or improvement in efficiency of at least 50% (e.g., 0.16 kWh/m3 for the gas infusion system versus 0.33 kWh/m2 for the conventional air blower system). Higher efficiencies can be achieved where the biological efficiency factor is smaller than 1.00 Kg $O_2$/Kg BOD.

Figure 22:
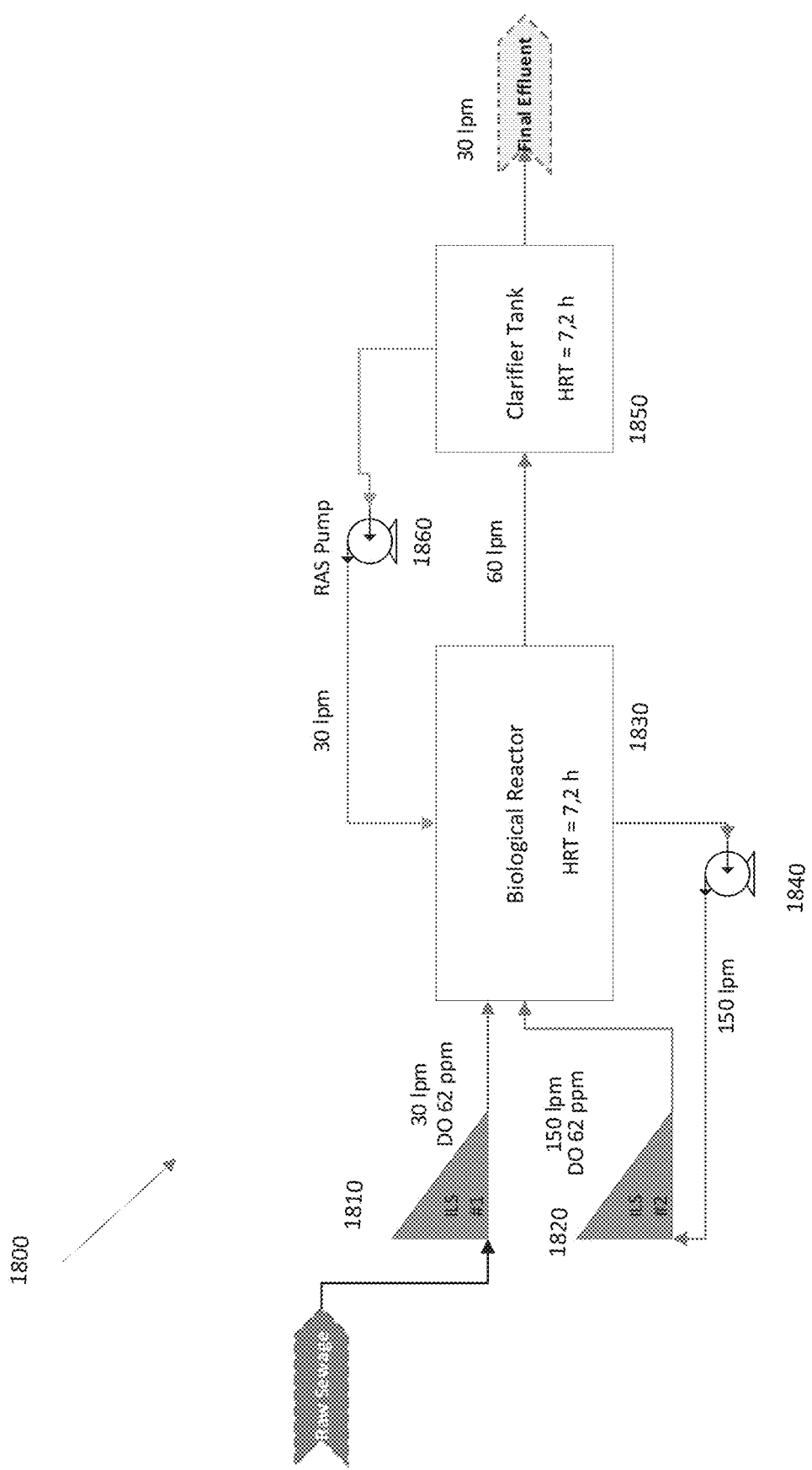
FIG. 22 is a schematic of a gas infusion system used in a wastewater treatment pilot test.
Figure 23:
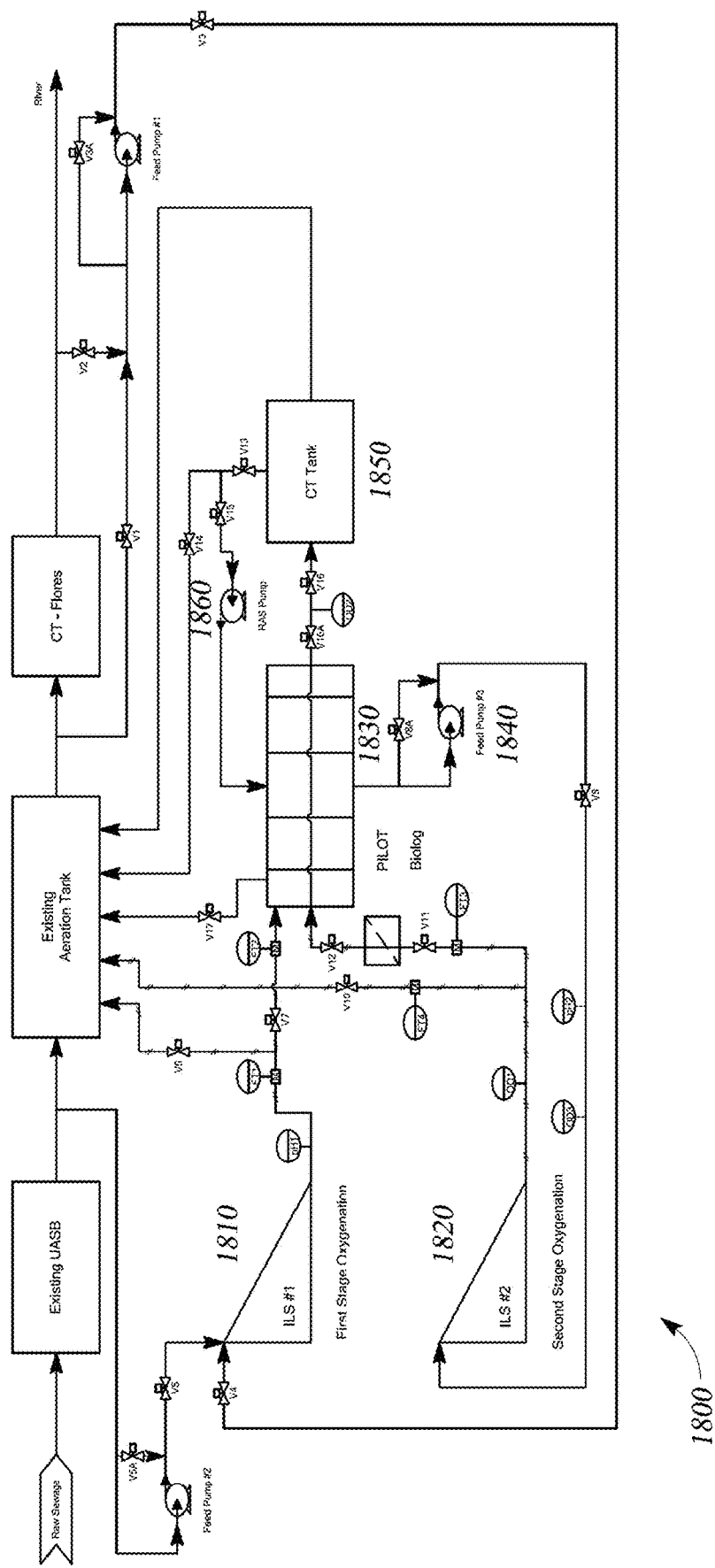
FIG. 23 is a more detailed schematic of the gas infusion system of FIG. 22.
Figure 24:
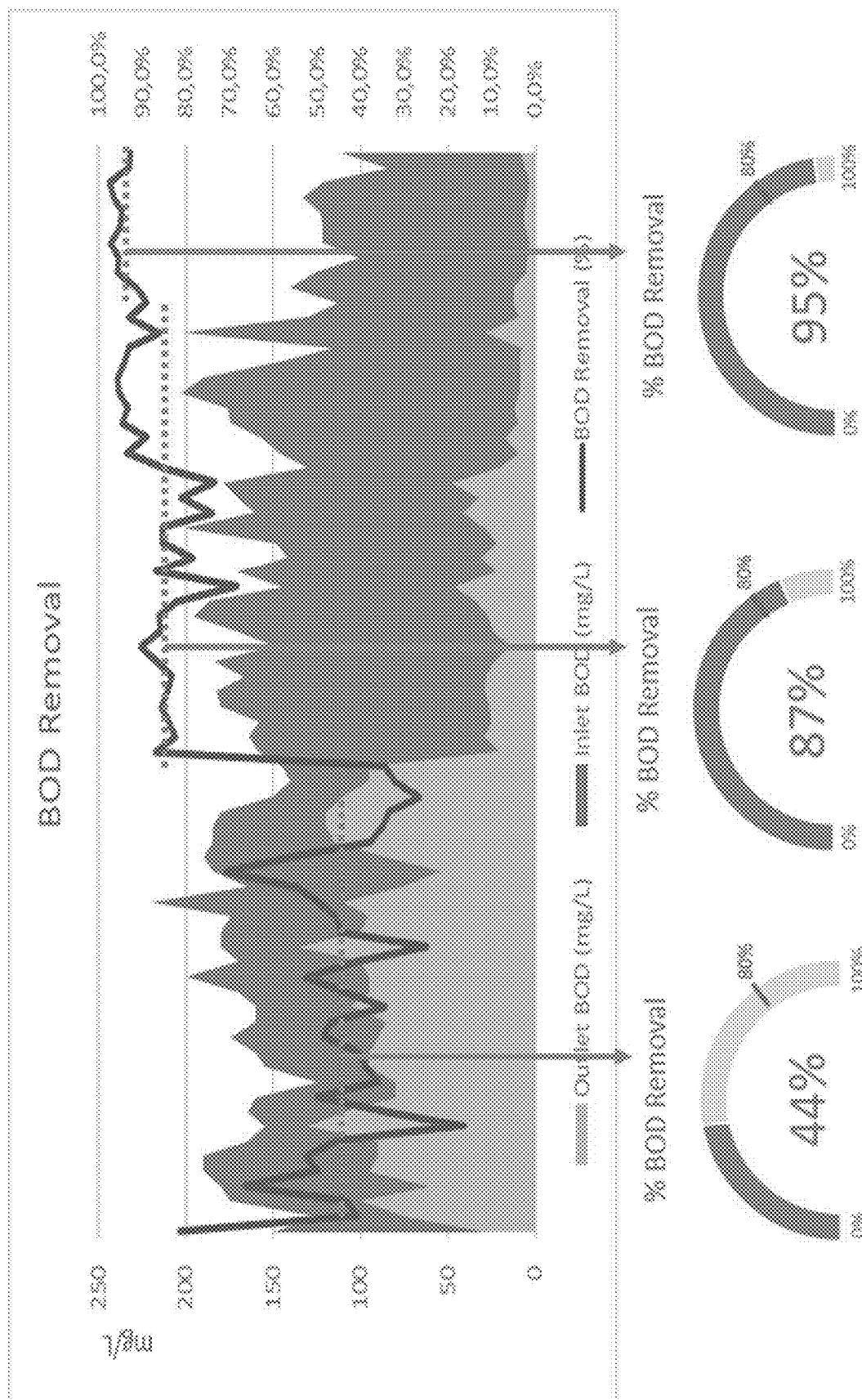
FIG. 24 is a chart showing improvement in BOD removal with the gas infusion system used in the wastewater treatment pilot test of FIGS. 22-23.

FIGS. 22-23 show a schematic diagram of a wastewater treatment system 1800 pilot test utilizing gas infusion modules and gas infusion systems or units in accordance with one or more embodiments described above (e.g., gas infusion unit 200 in FIG. 2, gas infusion modules 400 in FIGS. 4-7). FIG. 22 shows a more simplified schematic diagram and FIG. 23 shows a more detailed schematic diagram. FIG. 24 shows a chart showing improvement in BOD removal with the gas infusion system used in the wastewater treatment pilot test of FIGS. 22-23.

The system 1800 includes a first gas infusion unit or first inline saturator 1810 and a second gas infusion unit or second inline saturator 1820. The first inline saturator 1810 and the second inline saturator 1820 can be similar to gas infusion units or inline saturators described above (e.g., the gas infusion unit 200 in FIG. 2) that utilize gas infusion modules described above (e.g., the gas infusion modules 400 in FIGS. 4-7).

The first inline saturator 1810 receives wastewater from a pipe between an anaerobic treatment tank or Upflow Anaerobic Sludge Blanket (UASB) and an aeration tank of the wastewater treatment plant, as shown in FIG. 23. The first inline saturator 1810 infuses the wastewater with oxygen (e.g., in the manner described above by transferring oxygen to wastewater using the fibers in the gas infusion module(s)), and delivers the oxygen saturated wastewater to a biological reactor 1830 (e.g., also referred to an aeration tank in wastewater treatment plants). Wastewater is recirculated from the biological reactor 1830 via a pump 1840 to the second inline saturator 1820. The second inline saturator 1820 infuses the recirculated wastewater with oxygen (e.g., in the same manner as the first inline saturator 1810), and delivers the oxygen saturated wastewater to the biological reactor 1830. Wastewater is transferred from the biological reactor 1830 to a clarifier tank 1850. A portion of the wastewater flow is recirculated from the clarifier tank 1850 to the biological reactor 1830 via a recirculation pump 1860, and effluent is discharged from the clarifier tank 1850 (e.g., to the aeration tank of the existing wastewater treatment plant, as shown in FIG. 23).

During the pilot test of the system 1800, the first inline saturator 1810 supplied oxygen saturated wastewater at a flowrate of between 20 LPM and 60 LPM, such as 30 LPM (on average) and with dissolved oxygen of between 30 ppm and 70 ppm, such as 62 ppm to the biological reactor 1830. The pump 1840 recirculated wastewater from the biological reactor 1830 to the second inline saturator 1820 at a flowrate of between 90 LPM and 150 LPM, such 150 LPM (or an average of 120 LPM), and the second inline saturator 1820 supplied oxygen saturated wastewater at a flowrate of 90 LPM and 150 LPM, such as 150 LPM (or an average of 120 LPM) and with dissolved oxygen of between 30 ppm and 70 ppm, such as 62 ppm, to the biological reactor 1830. The biological reactor 1830 operated at a hydraulic retention time (HRT) of 7.2 hours (e.g., the amount of time the wastewater remained in the biological reactor 1830 before being discharged therefrom). Wastewater flowed between the second inline saturator 1820 and the clarifier tank 1850 at a flowrate of 60 LPM, a flow of 30 LPM was recirculated by the recirculation pump 1860 from the clarifier tank 1850 to the second inline saturator 1820, and a flow of 30 LPM of final effluent was discharged from the clarifier tank 1850 (e.g., to the aeration tank of the existing wastewater treatment plant). The clarifier tank 1850 also operated at a hydraulic retention time (HRT) of 7.2 hours. The first inline saturator 1810 and the second inline saturator 1820 operated at pressures of between 20 psi and 30 psi (e.g., an average of 25 psi).

As shown in FIG. 24, the system 1800 advantageously achieved a 95% reduction in BOD in the effluent flow, exceeding the required 80% removal target. Once the system 1800 achieved steady state of operation, it achieved an 87% reduction in BOD in the effluent flow (exceeding the required 80% removal target), up from an initial 44% reduction when the system 1800 was initially put into operation. The improved 95% reduction in BOD in the effluent flow was achieved following, among other modification, an increase in the HRT to that shown in FIG. 22, and the increase in recirculation flowrate to the second inline saturator 1820 shown in FIG. 22. In another implementation, the first inline saturator 1810 can be excluded and only the second inline saturator 1820 can be operated in the system 1800 to provide oxygen saturated wastewater to the biological reactor 1830. It will be appreciated that an optimized gas infusion system for an wastewater aeration system utilizing a balanced arrangement of gas infusion modules may achieve the oxygen levels per kilowatt hour obtained in the disclosure herein. The gas infusion modules and gas infusion systems (e.g., gas infusion units) described herein provide various advantages in the treatment of wastewater. For example, because infusion of wastewater with oxygen occurs in a bubble-free gas transfer manner, less oxygen is lost to the environment from bubbles breaking the surface tension of the aeration tank, allowing the saturation of wastewater with oxygen to improve the biological process in the aeration tank (e.g., biological reactor), such as by more efficient oxygenation and use of available oxygen. As a result, a significant reduction in power (e.g., by as much as 50%, 60% or more) is achieved as air blowers and other equipment typically uses in wastewater treatment plants for the aeration process can be replaced and/or augmented with gas infusion systems described herein. Additionally, the gas infusion systems and modules described herein advantageously achieve a reduction of biochemical oxygen demand (BOD) (e.g., up to 95%, as shown in FIG. 24), allow for a reduced footprint for blower requirements, thereby reducing plant size and capital expenditures. Further, the gas infusion systems and modules described herein advantageously provide a wastewater treatment plan with flexibility to increase oxygen to meet increased demand. Additionally, the modular construction of the gas infusion systems (e.g., ability to use multiple gas infusion units, for example, in parallel) facilitates expansion of plant capacity.

ADDITIONAL EMBODIMENTS

In embodiments of the present disclosure, an augment system for an acetabular cup may be in accordance with any of the following clauses:

Clause 1. A wastewater oxygenation system, comprising:
an oxygen source configured to supply pressurized oxygen of at least 70% purity; and
an oxygen infusion system comprising one or more oxygen infusion modules, each oxygen infusion module comprising a housing, a plurality of hydrophobic hollow microporous fibers disposed in the housing, each of the hydrophobic hollow microporous fibers having a longitudinal bore and a plurality of micropores on a circumferential wall about the longitudinal bore, each oxygen infusion module being in fluid communication with the oxygen source so that the plurality of hydrophobic hollow microporous fibers receive the pressurized oxygen from the oxygen source through the longitudinal bore thereof,
wherein the oxygen infusion system is configured to receive a flow of wastewater from a wastewater supply line such that the wastewater flows through each of the one or more oxygen infusion modules and comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater, the oxygenated wastewater discharged from the oxygen infusion system via a wastewater output connection.

Clause 2. The system of Clause 1, wherein the oxygen source is an oxygen generator configured to receive atmospheric air via an air intake.

Clause 3. The system of any preceding clause, wherein the micropores have a pore pathway diameter of between about 0.01 µm to about 5 µm.

Clause 4. The system of any preceding clause, wherein each of the plurality of hydrophobic hollow microporous fibers has a length of between about 9 inches and about 13 inches.

Clause 5. The system of any preceding clause, wherein the plurality of hydrophobic hollow microporous fibers has a packing factor within the housing of the oxygen infusion module of no more than approximately 38%.

Clause 6. The system of any preceding clause, wherein the plurality of hydrophobic hollow microporous fibers for each of the one or more oxygen infusion modules has a porosity of 75%.

Clause 7. The system of any preceding clause, wherein the plurality of hydrophobic hollow microporous fibers of each oxygen infusion module are woven into a mat configured to be rolled and disposed in the housing of the oxygen infusion module.

Clause 8. The system of any preceding clause, further comprising a housing that houses the oxygen source and the oxygen infusion system to provide a standalone gas infusion unit.

Clause 9. The system of Clause 8, wherein the housing that houses the oxygen source and the oxygen infusion system is a shipping container with a length of 20 feet to 40 feet.

Clause 10. The system of any preceding clause, wherein the wastewater and pressurized oxygen flow through the one or more gas infusion modules in a co-current manner.

Clause 11. The system of any preceding clause, wherein the oxygen infusion system includes housing that houses the one or more oxygen infusion modules.

Clause 12. The system of any preceding clause, wherein the one or more oxygen infusion modules are a plurality of oxygen infusion modules arranged in parallel so that the wastewater flows through the plurality of oxygen infusion modules in parallel and so that the pressurized oxygen flows through the plurality of oxygen infusion modules in parallel.

Clause 13. The system of Clause 12, wherein the plurality of oxygen infusion modules arranged in parallel are housed in a gas infusion tank.

Clause 14. The system of any preceding clause, wherein the one or more oxygen infusion modules include a first array of a plurality of oxygen infusion modules arranged in parallel and a second array of a plurality of oxygen infusion modules arranged in parallel, the second array arranged in series with the first array, so that the wastewater flows in parallel through the plurality of oxygen infusion modules of each of the first array and the second array, so that the pressurized oxygen flows in parallel through the plurality of oxygen infusion modules of the each of the first array and the second array, and so that the wastewater flows through the second array after it flows through the first array.

Clause 15. The system of Clause 14, wherein the first array of oxygen infusion modules is spaced vertically above the second array of oxygen infusion modules.

Clause 16. The system of any of Clauses 14-15, wherein the pressurized oxygen is introduced into the plurality of oxygen infusion modules via a gap between a pair of plates disposed above the plurality of oxygen infusion modules, said gap facilitating delivery of the pressurized oxygen at the same pressure and flowrate through the plurality of oxygen infusion modules.

Clause 17. The system of any preceding clause, further comprising a controller configured to control one or both of the flow of wastewater and the flow of pressurized oxygen through the one or more gas infusion modules.

Clause 18. The system of Clause 1, wherein the one or more oxygen infusion modules includes a first oxygen infusion module and a second oxygen infusion module, the second oxygen infusion module arranged in series with the first oxygen infusion module so that wastewater flows through the first oxygen infusion module and then flows through the second oxygen infusion module.

Clause 19. The system of any preceding clause, further comprising a gas vent configured to vent undissolved oxygen and nitrogen from the oxygen infusion system.

Clause 20. The system of any preceding clause, wherein the housing of each oxygen infusion module includes one or more openings in a sidewall of the housing via which wastewater enters the oxygen infusion module.

Clause 21. The system of Clause 20, wherein the one or more openings are a pair of openings on opposite sides of the housing.

Clause 22. A wastewater oxygenation system, comprising:
a tank having a cover with an inlet opening configured to receive a flow of wastewater therethrough, and a tank vessel disposed below the cover, the tank vessel having an outlet opening at a distal end of the tank vessel; and
a plurality of oxygen infusion modules arranged in parallel and disposed in the tank vessel below the cover, each oxygen infusion module comprising
a housing, and
a plurality of hydrophobic hollow microporous fibers disposed in the housing, each of the hydrophobic hollow microporous fibers having a longitudinal bore and a plurality of micropores on a circumferential wall about the longitudinal bore,
wherein each of the oxygen infusion modules is configured to receive a portion of the flow of wastewater such that the wastewater comes in contact with the circumferential wall of one or more of the plurality of hydrophobic hollow microporous fibers, and wherein each of the oxygen infusion modules is configured to receive a flow of pressurized oxygen so that the pressurized oxygen is transferred to the wastewater through the plurality of micropores such that oxygen transfer to the wastewater occurs free of oxygen bubbles in the wastewater, and wherein the wastewater flows through the plurality of oxygen infusion modules in parallel and so that the pressurized oxygen flows through the plurality of oxygen infusion modules in parallel, the oxygenated wastewater discharged from the tank via the outlet opening in the tank vessel.

Clause 23. The system of Clause 22, wherein the micropores have a pore pathway diameter of between about 0.01 μm to about 5 μm.

Clause 24. The system of any of Clauses 22-23, wherein each of the plurality of hydrophobic hollow microporous fibers has a length of between about 9 inches and about 13 inches.

Clause 25. The system of any of Clauses 22-24, wherein the plurality of hydrophobic hollow microporous fibers has a packing factor within the housing of the oxygen infusion module of no more than approximately 38%.

Clause 26. The system of any of Clauses 22-25, wherein the plurality of hydrophobic hollow microporous fibers for each of the oxygen infusion modules has a porosity of 75%.

Clause 27. The system of any of Clauses 22-26, wherein the plurality of hydrophobic hollow microporous fibers of each oxygen infusion module are woven into a mat configured to be rolled and disposed in the housing of the oxygen infusion module.

Clause 28. The system of any of Clauses 22-27, wherein the wastewater and the pressurized oxygen flow through the gas infusion modules in a co-current manner.

Clause 29. The system of any of Clauses 22-28, wherein the plurality of oxygen infusion modules arranged in parallel include a first array of oxygen infusion modules arranged in parallel and a second array of oxygen infusion modules arranged in parallel, the second array arranged in series with the first array so that the wastewater flows in parallel through the oxygen infusion modules of each of the first array and the second array, so that the pressurized oxygen flows in parallel through the oxygen infusion modules of the each of the first array and the second array, and so that the wastewater flows through the second array after it flows through the first array.

Clause 30. The system of Clause 29, wherein the first array of oxygen infusion modules is spaced vertically above the second array of oxygen infusion modules.

Clause 31. The system of any of Clauses 29-30, wherein the pressurized oxygen is introduced into the plurality of oxygen infusion modules via a gap between a pair of plates disposed above the plurality of oxygen infusion modules, said gap facilitating delivery of the pressurized oxygen at the same pressure and flowrate through the plurality of oxygen infusion modules.

Clause 32. The system of any of Clauses 22-31, further comprising a controller configured to control one or both of the flow of wastewater and the flow of pressurized oxygen through the one or more gas infusion modules.

Clause 33. The system of any of Clauses 22-32, further comprising a gas vent configured to vent undissolved oxygen and nitrogen from the oxygen infusion system.

Clause 34. The system of any of Clauses 22-33, wherein the housing of each oxygen infusion module includes one or more openings in a sidewall of the housing via which wastewater enters the oxygen infusion module.

Clause 35. The system of Clause 34, wherein the one or more openings are a pair of openings on opposite sides of the housing.

Clause 36. A wastewater oxygenation system, comprising:
a tank having a cover with an inlet opening configured to receive a flow of wastewater therethrough, and a tank vessel disposed below the cover, the tank vessel having an outlet opening at a distal end of the tank vessel;
a first array of oxygen infusion modules arranged in parallel and disposed in the tank vessel below the cover; and
a second array of oxygen infusion modules arranged in parallel and disposed in the tank vessel, the second array spaced below the first array so that the second array is in series with the first array,
each oxygen infusion module in the first array and the second array comprising
a housing, and
a plurality of hydrophobic hollow microporous fibers disposed in the housing, each of the hydrophobic hollow microporous fibers having a longitudinal bore and a plurality of micropores on a circumferential wall about the longitudinal bore,
wherein each of the oxygen infusion modules is configured to receive a portion of the flow of wastewater such that the wastewater comes in contact with the circumferential wall of one or more of the plurality of hydrophobic hollow microporous fibers, and wherein each of the oxygen infusion modules is configured to receive a flow of pressurized oxygen so that the pressurized oxygen is transferred to the wastewater through the plurality of micropores such that oxygen transfer to the wastewater occurs free of oxygen bubbles in the wastewater, and wherein the wastewater flows in parallel through the oxygen infusion modules of each of the first array and the second array, the pressurized oxygen flows in parallel through the oxygen infusion modules of the each of the first array and the second array, and the wastewater flows through the second array after it flows through the first array, the oxygenated wastewater discharged from the tank via the outlet opening in the tank vessel.

Clause 37. The system of Clause 36, wherein the micropores have a pore pathway diameter of between about 0.01 µm to about 5 µm.

Clause 38. The system of any of Clauses 36-37, wherein each of the plurality of hydrophobic hollow microporous fibers has a length of between about 9 inches and about 13 inches.

Clause 39. The system of any of Clauses 36-38, wherein the plurality of hydrophobic hollow microporous fibers has a packing factor within the housing of the oxygen infusion module of no more than approximately 38%.

Clause 40. The system of any of Clauses 36-39, wherein the plurality of hydrophobic hollow microporous fibers for each of the oxygen infusion modules has a porosity of 75%.

Clause 41. The system of any of Clauses 36-40, wherein the plurality of hydrophobic hollow microporous fibers of each oxygen infusion module are woven into a mat configured to be rolled and disposed in the housing of the oxygen infusion module.

Clause 42. The system of any Clauses 36-41, wherein the wastewater and the pressurized oxygen flow through the gas infusion modules in a co-current manner.

Clause 43. The system of any of Clauses 36-42, wherein the first array of oxygen infusion modules is spaced vertically above the second array of oxygen infusion modules.

Clause 44. The system of any of Clauses 36-43, wherein the pressurized oxygen is introduced into the plurality of oxygen infusion modules in either of the first array and second array via a gap between a pair of plates disposed above the plurality of oxygen infusion modules, said gap facilitating delivery of the pressurized oxygen at the same pressure and flowrate through the plurality of oxygen infusion modules.

Clause 45. The system of any of Clauses 36-44, further comprising a controller configured to control one or both of the flow of wastewater and the flow of pressurized oxygen through the one or more gas infusion modules.

Clause 46. The system of any of Clauses 36-45, further comprising a gas vent configured to vent undissolved oxygen and nitrogen from the oxygen infusion system, the gas vent in fluid communication with a fitting on a sidewall of the tank vessel and with a siphon break tube coupled to the outlet opening.

Clause 47. The system of any of Clauses 36-46, wherein the housing of each oxygen infusion module includes one or more openings in a sidewall of the housing via which wastewater enters the oxygen infusion module.

Clause 48. The system of Clause 47, wherein the one or more openings are a pair of openings on opposite sides of the housing.

Clause 49. An oxygen infusion module, comprising:
a housing;
a central tube that extends along an axis of the housing;
a top plug attached to a proximal end of the housing;
a bottom plug attached to a distal end of the housing;
a plurality of hydrophobic hollow microporous fibers disposed in the housing and suspended from a disc and arranged about the central tube, the hydrophobic hollow microporous fibers having a length shorter than a length of the housing, each of the hydrophobic hollow microporous fibers having a longitudinal bore and a plurality of micropores on a circumferential wall about the longitudinal bore; and
a vent in fluid communication with the central tube and with a space inside the housing about the central tube, the vent being configured to vent undissolved oxygen and nitrogen from the oxygen infusion module,
wherein the oxygen infusion module is configured to receive a flow of pressurized oxygen from an oxygen source so that the plurality of hydrophobic hollow microporous fibers receive the pressurized oxygen from the oxygen source through the longitudinal bore thereof,
wherein the oxygen infusion module is configured to receive a flow of wastewater such that the wastewater flows through the central tube and into the housing so that it comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater, the oxygenated wastewater discharged from the housing via one or more distal openings and via the bottom plug.

Clause 50. The module of Clause 49, wherein the micropores have a pore pathway diameter of between about 0.01 μm to about 5 μm.

Clause 51. The module of any of Clauses 49-50, wherein each of the plurality of hydrophobic hollow microporous fibers has a length of between about 9 inches and about 13 inches.

Clause 52. The module of any of Clauses 49-51, wherein the plurality of hydrophobic hollow microporous fibers has a packing factor within the housing of the oxygen infusion module of no more than approximately 38%.

Clause 53. The module of any of Clauses 49-52, wherein the plurality of hydrophobic hollow microporous fibers for each of the oxygen infusion modules has a porosity of 75%.

Clause 54. The module of any of Clauses 49-53, wherein the plurality of hydrophobic hollow microporous fibers of each oxygen infusion module are woven into a mat configured to be rolled and disposed in the housing of the oxygen infusion module.

Clause 55. The module of any of Clauses 49-54, wherein the wastewater and the pressurized oxygen flow through the gas infusion modules in a co-current manner.

Clause 56. An oxygen infusion module, comprising:
a housing with one or more openings on a sidewall of the housing via which wastewater enters the housing; and
a plurality of hydrophobic hollow microporous fibers disposed in the housing and suspended from a disc, each of the hydrophobic hollow microporous fibers having a longitudinal bore and a plurality of micropores on a circumferential wall about the longitudinal bore,
wherein the oxygen infusion module is configured to receive a flow of pressurized oxygen from an oxygen source so that the plurality of hydrophobic hollow microporous fibers receive the pressurized oxygen from the oxygen source through the longitudinal bore thereof,
wherein the oxygen infusion module is configured to receive a flow of wastewater via the one or more openings in the sidewall of the housing such that the wastewater comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater, the oxygenated wastewater discharged from the housing via a distal end of the housing.

Clause 57. The module of Clause 56, wherein the micropores have a pore pathway diameter of between about 0.01 μm to about 5 μm.

Clause 58. The module of any of Clauses 56-57, wherein each of the plurality of hydrophobic hollow microporous fibers has a length of between about 9 inches and about 13 inches.

Clause 59. The module of any of Clauses 56-58, wherein the plurality of hydrophobic hollow microporous fibers has a packing factor within the housing of the oxygen infusion module of no more than approximately 38%.

Clause 60. The module of any of Clauses 56-59, wherein the plurality of hydrophobic hollow microporous fibers for each of the oxygen infusion modules has a porosity of 75%.

Clause 61. The module of any of Clauses 56-60, wherein the plurality of hydrophobic hollow microporous fibers of each oxygen infusion module are woven into a mat configured to be rolled and disposed in the housing of the oxygen infusion module.

Clause 62. The module of any of Clauses 56-61, wherein the wastewater and the pressurized oxygen flow through the gas infusion modules in a co-current manner.

Clause 63. The module of any of Clauses 56-62, wherein the one or more openings are a pair of openings on opposite sides of the housing.

Clause 64. A method of oxygenating wastewater for use aerobic wastewater treatment, comprising:
generating a supply of pressurized oxygen using an oxygen generator, wherein the oxygen concentration is at least 70%;
supplying the pressurized oxygen to a first gas infusion system comprising one or more gas infusion modules, each gas infusion module comprising a housing, a plurality of hydrophobic hollow microporous fibers disposed in the housing, each of the hydrophobic hollow microporous fibers having a longitudinal bore and a plurality of micropores on a circumferential wall about the longitudinal bore, each gas infusion module being in fluid communication with the oxygen generator so that the pressurized oxygen is supplied to the plurality of hydrophobic hollow microporous fibers through the longitudinal bore thereof;
supplying a flow of wastewater to the one or more gas infusion modules such that the wastewater flows through each of the one or more gas infusion modules and comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater to form a supersaturated effluent having a level of oxygen concentration above 62 ppm; and
discharging the supersaturated effluent to an aeration reservoir.

Clause 65. The method of Clause 64, wherein the micropores have a pore pathway diameter of between about 0.01 μm to about 5 μm.

Clause 66. The method of any of Clause 64-65, wherein each of the plurality of hydrophobic hollow microporous fibers has a length of between about 9 inches and about 13 inches.

Clause 67. The method of any of Clauses 64-66, wherein the plurality of hydrophobic hollow microporous fibers has a packing factor within the housing of the gas infusion module of no more than approximately 38%.

Clause 68. The method of any of Clauses 64-67, wherein the plurality of hydrophobic hollow microporous fibers for each of the one or more gas infusion modules has a porosity of 75%.

Clause 69. The method of any of Clauses 64-68, wherein the plurality of hydrophobic hollow microporous fibers of each gas infusion module are woven into a mat configured to be rolled and disposed in the housing of the gas infusion module.

Clause 70. The method of any of Clauses 64-69, further comprising:
  supplying the pressurized oxygen to a second gas infusion system wherein the second gas infusion system comprises one or more gas infusion modules, each gas infusion module comprising a housing, a plurality of hydrophobic hollow microporous fibers disposed in the housing, each of the hydrophobic hollow microporous fibers having a longitudinal bore and a plurality of micropores on a circumferential wall about the longitudinal bore, each gas infusion module being in fluid communication with the oxygen generator so that the pressurized oxygen is supplied to the plurality of hydrophobic hollow microporous fibers through the longitudinal bore thereof;
  supplying effluent from the aeration reservoir to the one or more gas infusion modules of the second gas infusion system such that the effluent flows through each of the one or more gas infusion modules and comes in contact with the circumferential wall of one or more of the plurality of hydrophobic hollow microporous fibers so that the pressurized oxygen is transferred to the effluent through the plurality of micropores such that oxygen transfer to the wastewater occurs free of oxygen bubbles in the wastewater to form a supersaturated effluent having a level of oxygen concentration above 62 ppm; and
  discharging the supersaturated effluent to the aeration reservoir.

Clause 71. The method of Clause 70 further comprising:
  discharging wastewater from the aeration reservoir wherein a biological process in the aeration reservoir achieved a level of approximately 0.9 $KgO_2$/Kg BOD.

Clause 72. The method of Clause 70 wherein the wastewater is discharged into the aeration reservoir such that a power demand of a wastewater treatment process is between 0.16 $KWH/m^3$ wastewater treated and 0.75 $KWH/m^3$ sewage treated.

Clause 73. The method of Clause 70 wherein the wastewater is discharged into the aeration reservoir such that a power demand of a wastewater treatment process is approximately 0.35 $KWH/m^3$ wastewater treated.

Clause 74. The method of any of Clauses 64-73, further comprising supplying one or more gases to the first gas infusion system after supplying the pressurized oxygen to the first gas infusion system, the one or more gases configured to flow through the hydrophobic hollow microporous fibers in the housing and come in contact with the wastewater flowing through the one or more gas infusion modules via the plurality of micropores in order to replace the oxygen in the wastewater with the one or more gases, the one or more gases transferred to the wastewater free of bubbles.

Clause 75. The method of Clause 74, wherein the one or more gases is a mixed gas.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A method of oxygenating wastewater for use in aerobic wastewater treatment, comprising:
    generating a supply of pressurized oxygen using an oxygen generator, wherein the pressurized oxygen has an oxygen concentration of at least 85%;
    supplying the pressurized oxygen to a first gas infusion system comprising one or more gas infusion modules, each gas infusion module comprising a housing, a plurality of hydrophobic hollow microporous fibers disposed in the housing, each of the hydrophobic hollow microporous fibers having a longitudinal bore and a plurality of micropores on a circumferential wall about the longitudinal bore, each gas infusion module being in fluid communication with the oxygen generator so that the pressurized oxygen is supplied to the plurality of hydrophobic hollow microporous fibers through the longitudinal bore thereof;
    supplying a flow of wastewater to the one or more gas infusion modules such that the wastewater flows through each of the one or more gas infusion modules and comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater to form a supersaturated effluent having a level of oxygen concentration above 62 ppm; and
    discharging the supersaturated effluent to an aeration reservoir,
    wherein the one or more oxygen infusion modules include a first array of a plurality of oxygen infusion modules arranged in parallel and a second array of a plurality of oxygen infusion modules arranged in parallel, the second array arranged in series with the first array, so that the wastewater flows in parallel through the plurality of oxygen infusion modules of each of the first array and the second array, so that the pressurized oxygen flows in parallel through the plurality of oxygen infusion modules of the each of the first array and the second array, and so that the wastewater flows through the second array after it flows through the first array, and
    wherein the first array of the plurality of oxygen infusion modules is spaced vertically above the second array of the plurality of oxygen infusion modules.

2. The method of claim 1, wherein the micropores have a pore pathway diameter ranging from 0.01 μm to 5 μm.

3. The method of claim 1, wherein each of the plurality of hydrophobic hollow microporous fibers has a length ranging from 9 inches to 13 inches.

4. The method of claim 1, wherein the plurality of hydrophobic hollow microporous fibers has a packing factor within the housing of the gas infusion module of about 38%.

5. The method of claim 1, wherein the plurality of hydrophobic hollow microporous fibers for each of the one or more gas infusion modules has a porosity of 75%.

6. The method of claim 1, wherein the plurality of hydrophobic hollow microporous fibers of each gas infusion module are woven into a mat rolled and disposed in the housing of the gas infusion module.

7. The method of claim 1, further comprising:
    supplying the pressurized oxygen to a second gas infusion system wherein the second gas infusion system comprises one or more gas infusion modules, each gas infusion module comprising a housing, a plurality of hydrophobic hollow microporous fibers disposed in the housing, each of the hydrophobic hollow microporous fibers having a longitudinal bore and a plurality of micropores on a circumferential wall about the longitudinal bore, each gas infusion module being in fluid communication with the oxygen generator so that the pressurized oxygen is supplied to the plurality of hydrophobic hollow microporous fibers through the longitudinal bore thereof;

supplying effluent from the aeration reservoir to the one or more gas infusion modules of the second gas infusion system such that the effluent flows through each of the one or more gas infusion modules and comes in contact with the circumferential wall of one or more of the plurality of hydrophobic hollow microporous fibers so that the pressurized oxygen is transferred to the effluent through the plurality of micropores such that oxygen transfer to the wastewater occurs free of oxygen bubbles in the wastewater to form a supersaturated effluent having a level of oxygen concentration above 62 ppm; and discharging the supersaturated effluent to the aeration reservoir.

8. The method of claim 7, wherein the wastewater is discharged into the aeration reservoir such that a power demand of the method of oxygenating wastewater is approximately 0.16 KWH/m3 wastewater treated.

9. The method of claim 7, wherein the wastewater is discharged into the aeration reservoir such that a power demand of the method of oxygenating wastewater is approximately 0.35 KWH/m$^3$ wastewater treated.

10. A method of oxygenating wastewater for use in aerobic wastewater treatment, comprising:

generating a supply of pressurized oxygen using an oxygen generator, wherein the pressurized oxygen has an oxygen concentration of at least 85%;

supplying the pressurized oxygen to a first gas infusion system comprising a plurality of gas infusion modules, each gas infusion module comprising a housing, a plurality of hydrophobic hollow microporous fibers disposed in the housing, each of the hydrophobic hollow microporous fibers having a longitudinal bore and a plurality of micropores on a circumferential wall about the longitudinal bore, each gas infusion module being in fluid communication with the oxygen generator so that the pressurized oxygen is supplied to the plurality of hydrophobic hollow microporous fibers through the longitudinal bore thereof;

supplying a flow of wastewater to the plurality of gas infusion modules such that the wastewater flows through each of the one or more gas infusion modules and comes in contact with the circumferential wall of one or more of the plurality of hydrophobic hollow microporous fibers so that the pressurized oxygen is transferred to the wastewater through the plurality of micropores such that oxygen transfer to the wastewater occurs free of oxygen bubbles in the wastewater to form a supersaturated effluent having a level of oxygen concentration above 62 ppm; and discharging the supersaturated effluent to an aeration reservoir, wherein supplying the pressurized oxygen to the first gas infusion system further comprises introducing the pressurized oxygen via a gap between a pair of plates disposed above the plurality of oxygen infusion modules, said gap facilitating delivery of the pressurized oxygen at a same pressure and flowrate through the plurality of oxygen infusion modules.

11. The method of claim 10, wherein the micropores have a pore pathway diameter ranging from 0.01 µm to 5 µm.

12. The method of claim 10, wherein each of the plurality of hydrophobic hollow microporous fibers has a length ranging from 9 inches and 13 inches.

13. The method of claim 10, wherein the plurality of hydrophobic hollow microporous fibers has a packing factor within the housing of the gas infusion module of about 38%.

14. The method of claim 10, wherein the plurality of hydrophobic hollow microporous fibers for each of the one or more gas infusion modules has a porosity of 75%.

15. The method of claim 10, wherein the plurality of hydrophobic hollow microporous fibers of each gas infusion module are woven into a mat rolled and disposed in the housing of the gas infusion module.

16. The method of claim 10, further comprising:

supplying the pressurized oxygen to a second gas infusion system wherein the second gas infusion system comprises a second plurality of gas infusion modules, each gas infusion module comprising a housing, a plurality of hydrophobic hollow microporous fibers disposed in the housing, each of the hydrophobic hollow microporous fibers having a longitudinal bore and a plurality of micropores on a circumferential wall about the longitudinal bore, each gas infusion module being in fluid communication with the oxygen generator so that the pressurized oxygen is supplied to the plurality of hydrophobic hollow microporous fibers through the longitudinal bore thereof;

supplying effluent from the aeration reservoir to the second plurality of gas infusion modules of the second gas infusion system such that the effluent flows through each of the one or more gas infusion modules and comes in contact with the circumferential wall of one or more of the plurality of hydrophobic hollow microporous fibers so that the pressurized oxygen is transferred to the effluent through the plurality of micropores such that oxygen transfer to the wastewater occurs free of oxygen bubbles in the wastewater to form a supersaturated effluent having a level of oxygen concentration above 62 ppm; and discharging the supersaturated effluent to the aeration reservoir.

17. The method of claim 16, wherein the wastewater is discharged into the aeration reservoir such that a power demand of the method of oxygenating wastewater is approximately 0.16 KWH/m3 wastewater treated.

18. The method of claim 16, wherein the wastewater is discharged into the aeration reservoir such that a power demand of the method of oxygenating wastewater is approximately 0.35 KWH/m$^3$ wastewater treated.

* * * * *